United States Patent
Wakayoshi

(10) Patent No.: US 9,471,135 B2
(45) Date of Patent: Oct. 18, 2016

(54) COMMUNICATION CONTROL APPARATUS, INFORMATION PROCESSING APPARATUS, AND INFORMATION PROCESSING SYSTEM

(71) Applicant: FUJITSU LIMITED, Kawasaki-shi, Kanagawa (JP)

(72) Inventor: Yoshikatsu Wakayoshi, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 377 days.

(21) Appl. No.: 14/057,715

(22) Filed: Oct. 18, 2013

(65) Prior Publication Data
US 2014/0143563 A1    May 22, 2014

(30) Foreign Application Priority Data

Nov. 20, 2012    (JP) ................................ 2012-254481

(51) Int. Cl.
*G06F 1/32*    (2006.01)
*H04L 12/12*    (2006.01)
*H04L 12/24*    (2006.01)

(52) U.S. Cl.
CPC ............. *G06F 1/3287* (2013.01); *H04L 12/12* (2013.01); *H04L 41/0833* (2013.01); *Y02B 60/34* (2013.01)

(58) Field of Classification Search
CPC .... G06F 1/3287; G06F 9/4418; G06F 9/442; H04L 12/12; H04L 41/0833; Y02B 60/34
See application file for complete search history.

(56) References Cited

U.S. PATENT DOCUMENTS

| 6,591,368 B1 | 7/2003 | Ryu |
| 2005/0123109 A1 | 6/2005 | Yamagishi et al. |
| 2007/0130481 A1* | 6/2007 | Takahashi ............... G06F 21/41 713/300 |
| 2008/0183880 A1* | 7/2008 | Sasage ...................... G06F 1/26 709/229 |
| 2009/0193272 A1 | 7/2009 | Matsuzawa et al. |
| 2010/0226662 A1 | 9/2010 | Takatani |
| 2011/0202983 A1* | 8/2011 | Pope ..................... G06F 21/572 726/7 |

FOREIGN PATENT DOCUMENTS

| EP | 2282481 A1 | 2/2011 |
| JP | 2000-89864 | 3/2000 |
| JP | 2005-175265 | 6/2005 |
| JP | 2009-176033 | 8/2009 |
| JP | 2010-201770 | 9/2010 |
| JP | 2011-39920 | 2/2011 |

OTHER PUBLICATIONS

Chin-Hung Li et al., "An Efficient Approach for Reducing Power Consumption in a Production-Run Cluster", 2010 Third International Joint Conference on Computational Science and Optimization (CSO), IEEE, May 2010, pp. 293-299.
"Formasa II HPC Cluster", Aug. 2008, retrieved Feb. 20, 2014 from wayback.archive.org/web/20080821124109/www.nchc.org.tw/htdocs/outside_service/hardware/formosa_2.php, pp. 1-2.
IBM Redbooks, "IBM eServer xSeries and BladeCenter Server Management", Apr. 2005, retrieved from proquest.safaribooksonline.com/0738490687, pp. i-xii, 1-315.
Extended European Search Report mailed Mar. 3, 2014 in corresponding European Application No. 13190832.9.
Office Action dated Jun. 28, 2016 in corresponding Japanese Patent Application No. 2012-254481.

* cited by examiner

*Primary Examiner* — Dennis M Butler
(74) *Attorney, Agent, or Firm* — Staas & Halsey LLP

(57) ABSTRACT

A communication control apparatus includes: a first receiving unit that receives a power supply packet; a power supply unit that performs a power supply control at the time of detecting reception of the power supply packet; and a second receiving unit that receives a power disconnection packet and outputs the power disconnection packet to an external control apparatus.

7 Claims, 17 Drawing Sheets

FIG. 3

| Field | Size | Detail |
|---|---|---|
| Target Address | 1 byte | SLAVE ADDRESS OR SOFTWARE IDs OF TRANSMISSION DESTINATION |
| NetFn | 6 bit | 00h = Chassis Request |
| Target LUN | 2 bit | LOGIC UNIT NUMBER OF TRANSMISSION DESTINATION |
| Header checksum | 1 byte | CHECKSUM OF UPPER TWO BYTE |
| Source Address | 1 byte | SLAVE ADDRESS OR SOFTWARE IDs OF TRANSMISSION SOURCE |
| SeqNo | 6 bit | SEQUENCE NUMBER |
| Source LUN | 2 bit | LOGIC UNIT NUMBER OF TRANSMISSION SOURCE |
| Command code | 1 byte | 02h = Chassis Control |
| Request Data | 1 byte | [7:4] - reserved<br>[3:0] - chassis control<br>0h = power down. Force system into soft off (S4/S45) state. This is for 'emergency' management power down actions. The command does not initiate a clean shut-down of the operating system prior to powering down the system.<br>1h = power up. ← A<br>2h = power cycle (optional). This command provides a power off interval of at least 1 second following the deassertion of the system's POWERGOOD status from the main power subsystem. It is recommended that no action occur if system power is off (S4/S5) when this action is selected, and that a D5h "Request parameter(s) not supported in present state." error completion code be returned. Note that some implementations may cause a system power up if a power cycle operation is selected when system power is down. For consistency of operation, it is recommended that system management software first check the system power state before issuing a power cycle, and only issue the command if system power is ON or in a lower sleep state than S4/S5.<br>3h = hard reset. In some implementations, the BMC may not know whether a reset will cause any particular effect and will pulse the system reset signal regardless of power state. If the implementation can tell that no action will occur if a reset is delivered in a given power state, then it is recommended (but still optional) that a D5h "Request parameter(s) not supported in present state." error completion code be returned.<br>4h = pulse Diagnostic Interrupt. (optional) Pulse a version of a diagnostic interrupt that goes directly to the processor(s). This is typically used to cause the operating system to do a diagnostic dump (OS dependent). The interrupt is commonly an NMI on IA-32 systems and an INIT on Intel® Itanium™ processor based systems.<br>5h = Initiate a soft-shutdown of OS via ACPI by emulating a fatal over temperature. (optional) ← B<br>all other = reserved |
| Data checksum | 1 byte | CHECKSUM OF DATA AFTER HEADER CHECKSUM |

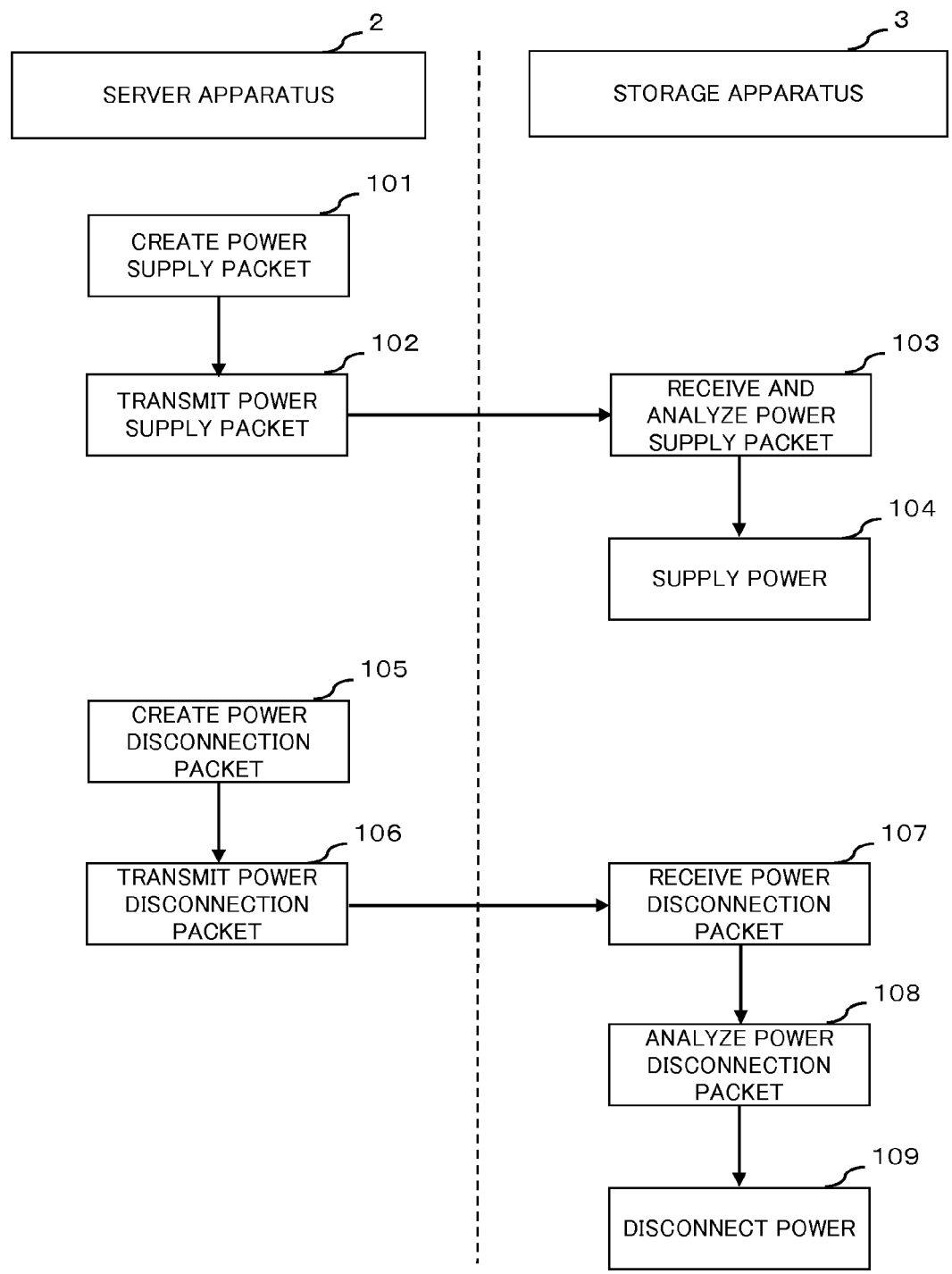

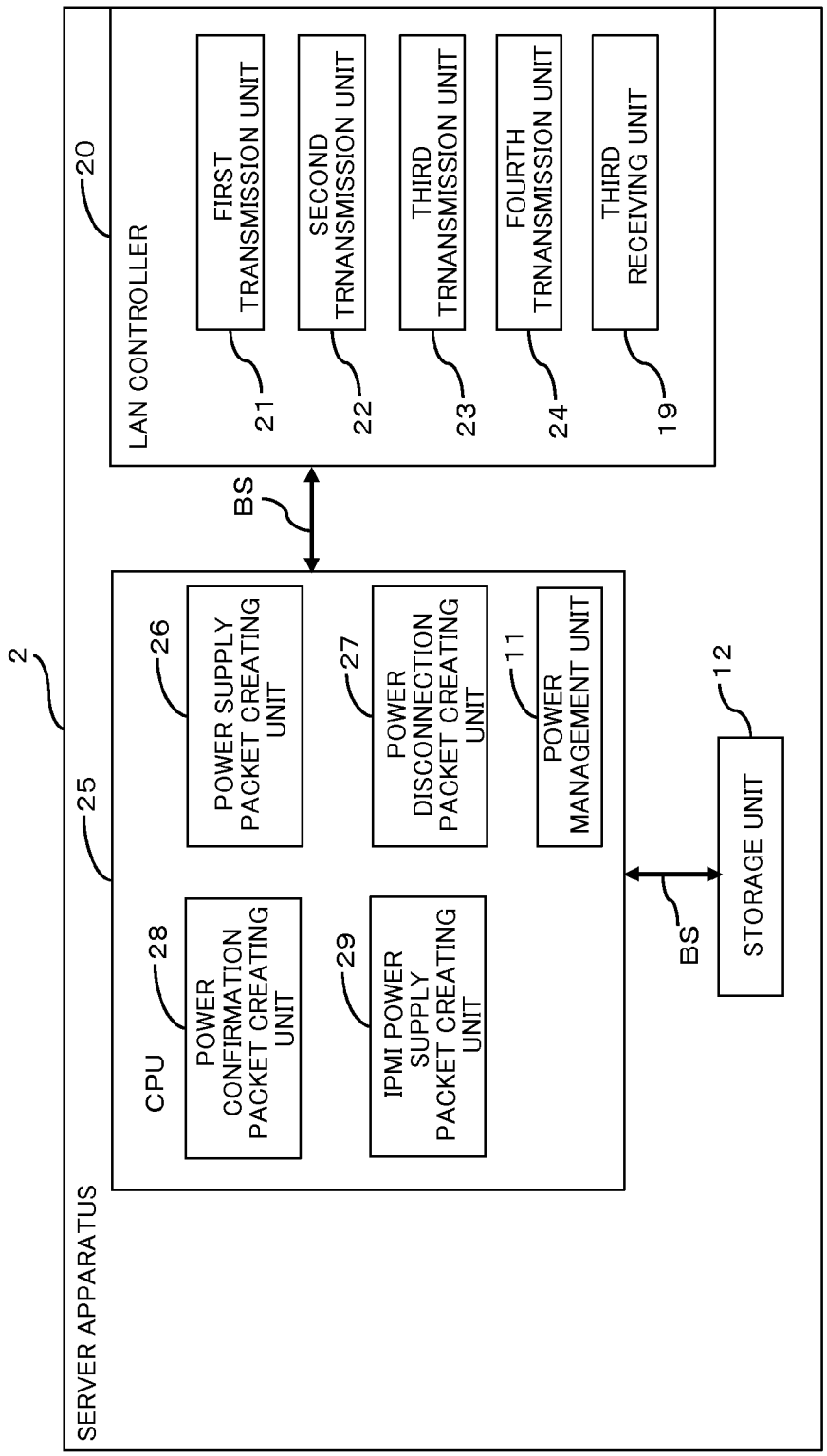

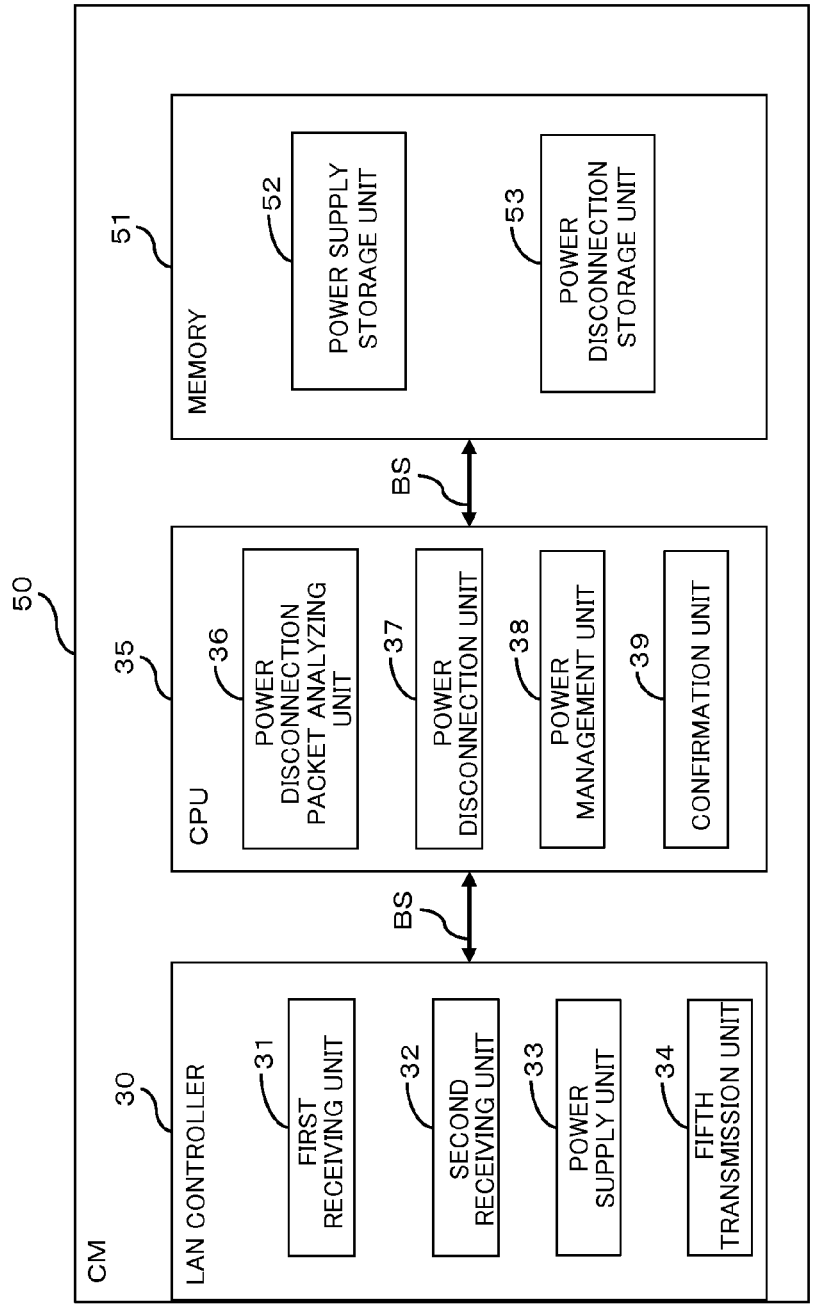

FIG. 10

| Field | Size | Detail |
|---|---|---|
| Target Address | 1 byte | SLAVE ADDRESS OR SOFTWARE IDs OF TRANSMISSION DESTINATION |
| NetFn | 6 bit | 00h = Chassis Request |
| Target LUN | 2 bit | LOGIC UNIT NUMBER OF TRANSMISSION DESTINATION |
| Header checksum | 1 byte | CHECKSUM OF UPPER TWO BYTE |
| Source Address | 1 byte | SLAVE ADDRESS OR SOFTWARE IDs OF TRANSMISSION SOURCE |
| SeqNo | 6 bit | SEQUENCE NUMBER |
| Source LUN | 2 bit | LOGIC UNIT NUMBER OF TRANSMISSION SOURCE |
| Command code | 1 byte | 01h = Get Chassis Status |
| Request Data | 1 byte | (NONE) |
| Data checksum | 1 byte | CHECKSUM OF DATA AFTER HEADER CHECKSUM |

FIG. 11

| Field | | Size | Detail |
|---|---|---|---|
| Target Address | | 1 byte | SLAVE ADDRESS OR SOFTWARE IDs OF TRANSMISSION DESTINATION |
| NetFn | | 1 bit | 01h = Chassis Response |
| Target LUN | | 2 bit | LOGIC UNIT NUMBER OF TRANSMISSION DESTINATION |
| Header checksum | | 1 byte | CHECKSUM OF UPPER TWO BYTE |
| Source Address | | 1 byte | SLAVE ADDRESS OR SOFTWARE IDs OF TRANSMISSION SOURCE |
| SeqNo | | 6 bit | SEQUENCE NUMBER |
| Source LUN | | 2 bit | LOGIC UNIT NUMBER OF TRANSMISSION SOURCE |
| Command code | | 1 byte | 01h = Get Chassis Status |
| Response Data | Current Power State | 1 byte | [7] - reserved<br>[6:5] - power restore policy[1]<br>00b = chassis stays powered off after AC/mains returns<br>01b = after AC returns, power is restored to the state that was in effect when AC/mains was lost<br>10b = chassis always powers up after AC/mains returns<br>11b = unknown<br>[4] - power control fault<br>1b = Controller attempted to turn system power on or off, but system did not enter desired state.<br>[3] - power fault<br>1b = fault detected in main power subsystem.<br>[2] - 1b = Interlock (chassis is presently shut down because a chassis panel interlock switch is active). (IPMI 1.5)<br>[1] - Power overload<br>1b = system shutdown because of power overload condition.<br>[0] - Power is on<br>1b = system power is on  ← C<br>0b = system power is off (soft-off S4/S5 or mechanical off)  ← D |
| | Last Power Event | 1 byte | [7:5] - reserved<br>[4] - 1b = last 'Power is on' state was entered via IPMI command<br>[3] - 1b = last power down caused by power fault<br>[2] - 1b = last power down caused by a power interlock being activated<br>[1] - 1b = last power down caused by a Power overload<br>[0] - 1b = AC failed |

FIG. 12

| Field | | Size | Detail |
|---|---|---|---|
| | | | |
| Response Data | Misc. Chassis State | 1 byte | Misc. Chassis State<br>[7:4] - reserved<br>[6] - 1b = Chassis Identify command and state info supported (Optional)<br>0b = Chassis Identify command support unspecified via this command. (The Get Command Support command, if implemented, would still indicate support for the Chassis Identify command)<br>[5:4] - Chassis Identify State. Mandatory when bit [6] = 1b, reserved (return as 00b) otherwise. Returns the present chassis identify state. Refer to the Chassis Identify command for more info.<br>00b = chassis identify state = Off<br>01b = chassis identify state = Temporary (timed) On<br>10b = chassis identify state = Indefinite On<br>11b = reserved<br>[3] - 1b = Cooling/fan fault detected<br>[2] - 1b = Drive Fault<br>[1] - 1b = Front Panel Lockout active (power off and reset via chassis push-buttons disabled.)<br>[0] - 1b = Chassis intrusion active |
| | Front Panel Button Capabilities and disable/enable status | (1 byte) | (Optional)<br>("Button" actually refers to the ability for the local user to be able to perform the specified functions via a pushbutton, switch, or other 'front panel' control built into the system chassis.)<br>[7] - 1b = Standby (sleep) button disable allowed<br>[6] - 1b = Diagnostic Interrupt button disable allowed<br>[5] - 1b = Reset button disable allowed<br>[4] - 1b = Power off button disable allowed (in the case there is a single combined power/standby (sleep) button, disabling power off also disables sleep requests via that button.)<br>[3] - 1b = Standby (sleep) button disabled<br>[2] - 1b = Diagnostic Interrupt button disabled<br>[1] - 1b = Reset button disabled<br>[0] - 1b = Power off button disabled (in the case there is a single combined power/standby (sleep) button, then this indicates that sleep requests via that button are also disabled.) |
| Data checksum | | 1 byte | CHECKSUM OF DATA AFTER HEADER CHECKSUM |

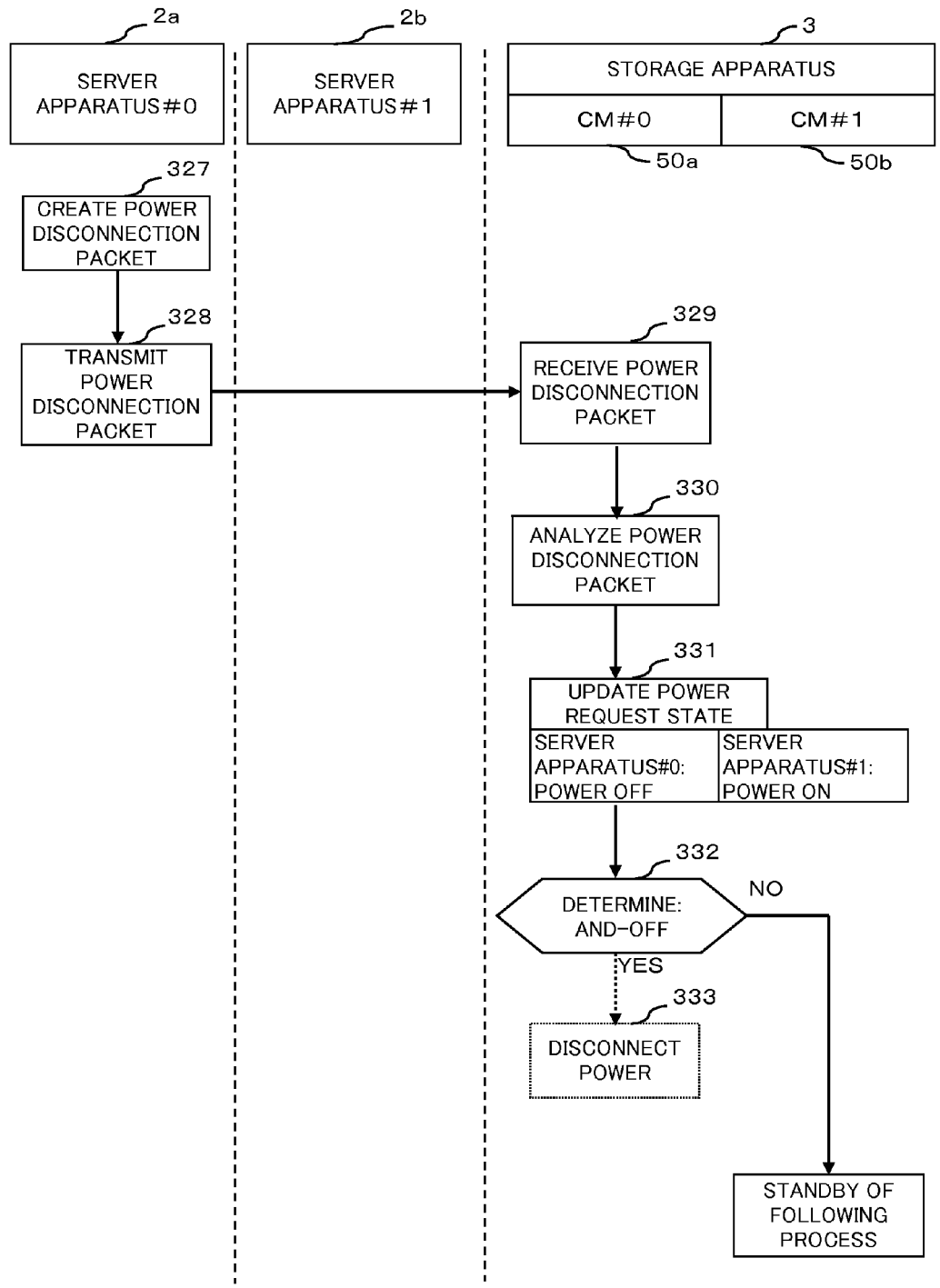

COMMUNICATION CONTROL APPARATUS, INFORMATION PROCESSING APPARATUS, AND INFORMATION PROCESSING SYSTEM

CROSS-REFERENCE TO RELATED APPLICATION

This application is based upon and claims the benefit of priority of the prior Japanese Patent application No. 2012-254481, filed on Nov. 20, 2012, the entire contents of which are incorporated herein by reference.

FIELD

The embodiments discussed herein are directed to a communication control apparatus, an information processing apparatus, and an information processing system.

BACKGROUND

In a server apparatus and a storage apparatus that are provided with a Local Area Network controller (LAN controller, communication control apparatus), there are known methods in which the server apparatus performs a remote power control using LAN on the storage apparatus. Here, the remote power control is that server apparatus operates a power state (ON/OFF) of the storage apparatus which is remotely situated.

As a remote power control interface, for example, techniques for using a general-purpose Intelligent Platform Management Interface (IPMI) protocol are known.

In the remote power control method using the IPMI, the server apparatus transmits IPMI packet Chassis Control Command of a power supply/disconnection request to the storage apparatus acting as a target through the LAN. The storage apparatus analyzes a received packet and transits into the power state according to the request.

Here, when the storage apparatus is in a standby power (DC-OFF) state, a main Central Processing Unit (CPU) provided in the storage apparatus is not operated. Therefore, when the power supply request is transmitted from the server apparatus to the storage apparatus which is in the standby power (DC-OFF) state, it is difficult that the main CPU of the storage apparatus analyzes a packet received from the server apparatus and transits the storage apparatus to become a DC-ON state.

For this reason, the storage apparatus is provided with an IPMI processing-dedicated circuit chip (hereinafter, referred to as a dedicated circuit chip) to analyze the IPMI packet received from the server apparatus.
[Patent Literature 1] Japanese Laid-Open Patent Publication No. 2000-89864
[Patent Literature 2] Japanese Laid-Open Patent Publication No. 2011-39920

In the related arts, however, since the storage apparatus needs to be provided with the dedicated circuit chip to analyze the IPMI packet, there is a problem that the fabricating cost of the storage apparatus increases. In order to wait for the IPMI packet, further, since the dedicated circuit chip needs to be constantly activated with a standby power, there is also a problem that the consumption power of the storage apparatus increases and the operational cost increases.

Accordingly, it is needed to reliably perform the remote power control without spending the above-described costs.

SUMMARY

Accordingly, a communication control apparatus includes a first receiving unit that receives a power supply packet, a power supply unit that performs a power supply control at the time of detecting reception of the power supply packet, and a second receiving unit that receives a power disconnection packet and outputs the power disconnection packet to an external control apparatus.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for describing a data format of an IPMI LAN Message;

FIG. 4 is a diagram for describing processing of a power control in the information processing system as an example of the first embodiment;

FIG. 8 is a diagram illustrating a server apparatus as an example of the second embodiment;

FIG. 9 is a diagram illustrating a configuration of a controller module as an example of the second embodiment;

FIG. 10 is a diagram for describing a data format of an IPMI LAN Message;

FIG. 11 is a diagram for describing a data format of an IPMI LAN Message;

FIG. 12 is a diagram for describing a data format of an IPMI LAN Message;

FIG. 17 is a diagram for describing processing of a power control in the information processing system as an example of the second embodiment.

DESCRIPTION OF EMBODIMENT(S)

Figure 1:
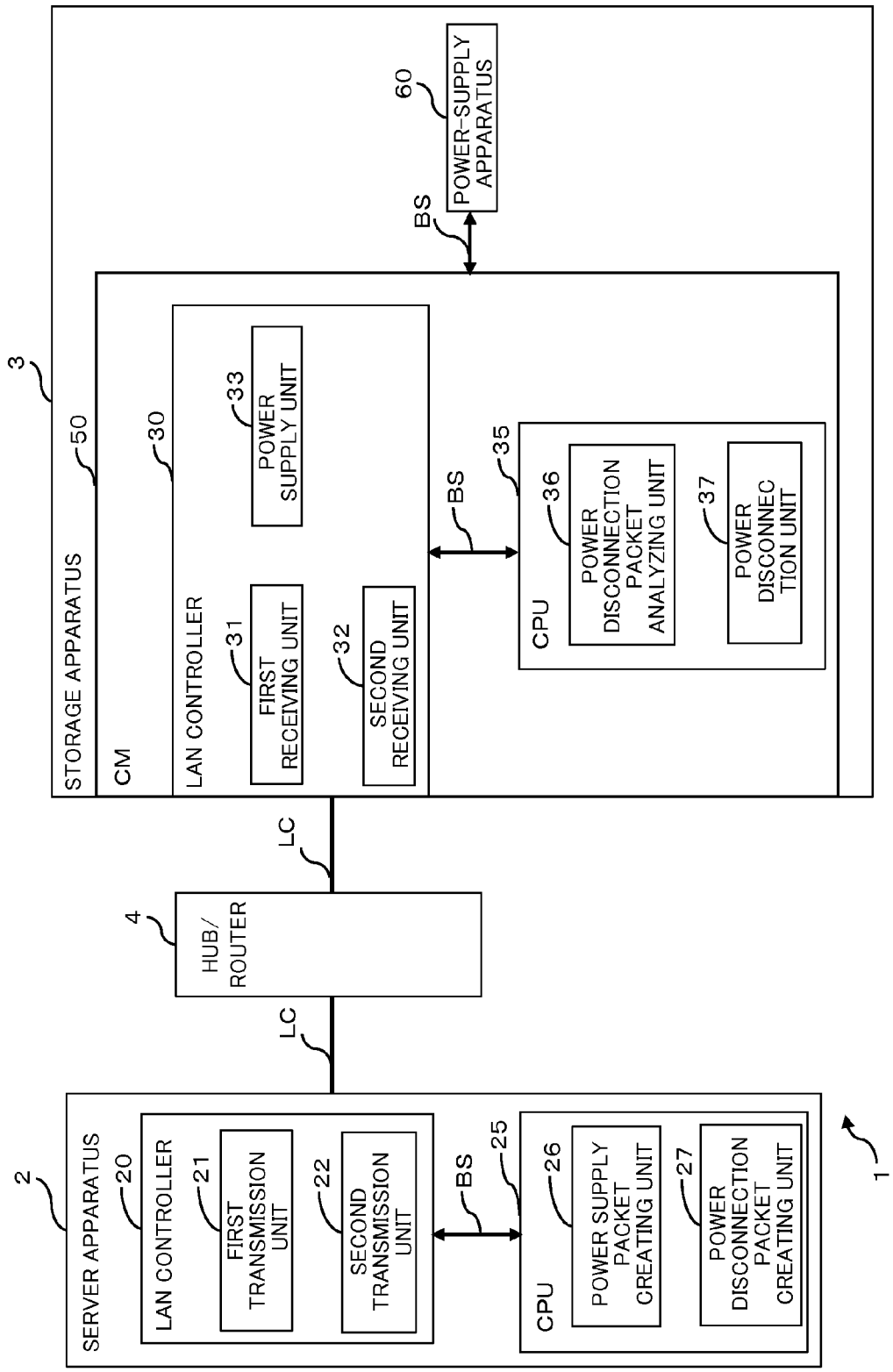
FIG. 1 is a diagram illustrating a configuration of an information processing system as an example of a first embodiment.

Hereinafter, a communication control apparatus, an information processing apparatus, and an information processing system according to exemplary embodiments will be described with reference to drawings. However, the following exemplary embodiments are merely illustrative, and not intended to exclude various modifications and applications of the techniques that are not specified in the embodiments. That is, the embodiments may be modified in various ways (for example, combination of embodiments and each modification) and implemented without departing from the spirit and scope of the invention.

Further, it is not intended that each drawing includes only components illustrated in the drawings, but the drawing may include other functions or the like.

[A] First Embodiment

[A-1] System Configuration

FIG. 1 is a diagram illustrating a configuration of an information processing system according to a first embodiment.

As illustrated in FIG. 1, the information processing system 1 includes a server apparatus (higher-level apparatus) 2, a storage apparatus (information processing apparatus) 3, and a hub (relay apparatus) 4. Note that, the hub 4 may be a router.

The server apparatus 2 and the storage apparatus 3 are communicably connected to each other through the hub 4 and a LAN cable LC. However, the server apparatus 2 and the hub 4 or the storage apparatus 3 and the hub 4 do not need to be connected to each other by the LAN cable LC, but may communicably be connected to each other through a wireless LAN, for example. Further, the server apparatus 2 may directly be connected to the storage apparatus 3 through the LAN cable LC or the wireless LAN to communicate to each other even without using the hub 4.

In the information processing system 1, since the server apparatus 2 performs a remote power control on the storage apparatus 3, the server apparatus 2 includes a LAN controller (communication control apparatus, communication control unit) 20 and a CPU (control apparatus) 25.

The LAN controller 20 and the CPU 25 are communicably connected to each other through a bus line BS.

The CPU 25 is a processing apparatus which performs various controls or operations and implements various functions by executing an operating system (OS) or a program stored in a memory which is not illustrated. That is, as illustrated in FIG. 1, the CPU 25 functions as a power supply packet creating unit 26 and a power disconnection packet creating unit 27.

Further, the CPU 25 of the server apparatus 2 functions as the power supply packet creating unit 26 and the power disconnection packet creating unit 27 by executing a power control program.

Note that, the program (power control program) used for implementing the function as the power supply packet creating unit 26 and the power disconnection packet creating unit 27 is provided in such a form that the program is recorded on a computer-readable recording medium such as, for example, a flexible disk, a CD (CD-ROM, CD-R, CD-RW or the like), a DVD (DVD-ROM, DVD-RAM, DVD-R, DVD+R, DVD-RW, DVD+RW, HD DVD or the like), a Blu-ray disc, a magnetic disk, an optical disk, a magnet-optical disk or the like. Further, a computer reads out the program from the recording medium thereof, transfers and stores the read program to and in an internal memory device or an external memory device, and uses the program. In addition, the program may be recorded on the memory device (recording medium) such as, for example, the magnetic disk, the optical disk, the magnet-optical disk or the like, and then be provided from the memory device to the computer through a communication path.

At the time of implementing the function as the power supply packet creating unit 26 and the power disconnection packet creating unit 27, the program stored in the internal memory device (memory which is not illustrated in the first embodiment) is executed by a microprocessor (CPU 25 in the first embodiment) of the computer. At this time, the program recorded on the recording medium may be read and then be executed by the computer.

Note that, in the first embodiment, the term "computer" represents the concept including hardware and an OS and refers to the hardware for operating under the OS control. Further, when the hardware is operated with the application program alone without using the OS, the hardware corresponds in itself to the computer. The hardware includes at least the microprocessor such as the CPU 25 and a method for reading the computer program recorded on the recording medium. In the first embodiment, the server apparatus 2 and the storage apparatus 3 has the function as the computer.

The power supply packet creating unit 26 creates a power supply packet for instructing a LAN controller 30, which will be described later, of the storage apparatus 3 to supply a power to the storage apparatus 3. In addition, the power supply packet creating unit 26 delivers the created power supply packet to a first transmission unit 21, which will be described later, of the LAN controller 20.

The power disconnection packet creating unit 27 creates a power disconnection packet for instructing a CPU 35, which will be described later, of the storage apparatus 3 to disconnect a power from the storage apparatus 3. In addition, the power disconnection packet creating unit 27 delivers the created power disconnection packet to a second transmission unit 22, which will be described later, of the LAN controller 20.

In the server apparatus 2, the LAN controller 20 has a function for transmitting various packets created by the CPU 25 to the storage apparatus 3 and includes the first transmission unit 21 and the second transmission unit 22.

The first transmission unit 21 transmits, to the storage apparatus 3, the power supply packet serving as a magic packet recognized by a Wake ON LAN (WOL) function created by the power supply packet creating unit 26.

The second transmission unit 22 transmits, to the storage apparatus 3, the power disconnection packet serving as an IPMI packet created by the power disconnection packet creating unit 27.

In the information processing system 1, the storage apparatus 3 is executed by the remote power control of the server apparatus 2 and includes a control module (CM) 50 and a power-supply apparatus 60.

The CM 50 and the power-supply apparatus 60 are communicably connected to each other through a bus line BS.

The power-supply apparatus 60 is an existing apparatus for supplying a power to the storage apparatus 3, and the detailed description thereof will not be presented.

The CM 50 performs various controls according to storage access requests (access control signal: hereinafter, referred to as a host I/O) received from the server apparatus 2.

The CM 50 includes a LAN controller (communication control apparatus, communication control unit) 30 and a CPU (control apparatus) 35.

These LAN controller 30 and CPU 35 are communicably connected to each other through a bus line BS.

In the storage apparatus 3, the LAN controller 30 has a function for receiving various packets transmitted from the LAN controller 20 of the server apparatus 2 and a function for performing the power supply of the apparatus (storage apparatus 3). The LAN controller 30 includes a first receiving unit 31, a second receiving unit 32, and a power supply unit 33.

The first receiving unit 31 receives the power supply packet transmitted from the first transmission unit 21 of the LAN controller 20 of the server apparatus 2. In addition, the first receiving unit 31 analyzes the received power supply packet and instructs the power supply unit 33 which will be described later to supply a power to the own apparatus (storage apparatus 3).

The second receiving unit 32 receives the power disconnection packet transmitted from the second transmission unit 22 of the LAN controller 20 of the server apparatus 2 and delivers the received power disconnection packet to a power disconnection packet analyzing unit 36, which will be described later, of the CPU 35.

The power supply unit 33 receives instruction of the power supply from the first receiving unit 31 and instructs the power-supply apparatus 60 of the apparatus (storage apparatus 3) to supply a power.

In the storage apparatus 3, the CPU 35 has a function for analyzing the power disconnection packet and a function for performing the power disconnection of the apparatus (storage apparatus 3) and includes the power disconnection packet analyzing unit 36 and a power disconnection unit 37.

The CPU 35 is a processing apparatus which performs various controls or operations and implements various functions by executing the OS or the program stored in the memory which is not illustrated. That is, as illustrated in FIG. 1, the CPU 35 functions as the power disconnection packet analyzing unit 36 and the power disconnection unit 37.

Further, the CPU 35 of the storage apparatus 3 functions as the power disconnection packet analyzing unit 36 and the power disconnection unit 37 by executing the power control program.

Note that, the program (power control program) used for implementing the function as the power disconnection packet analyzing unit 36 and the power disconnection unit 37 is provided in such a form that the program is recorded on the computer-readable recording medium such as, for example, the flexible disk, the CD (CD-ROM, CD-R, CD-RW or the like), the DVD (DVD-ROM, DVD-RAM, DVD-R, DVD+R, DVD-RW, DVD+RW, HD DVD or the like), the Blu-ray disc, the magnetic disk, the optical disk, the magnet-optical disk or the like. Further, the computer reads out the program from the recording medium thereof, transfers and stores the read program to and in the internal memory device or the external memory device, and uses the program. In addition, the program may be recorded on the memory device (recording medium) such as, for example, the magnetic disk, the optical disk, the magnet-optical disk or the like, and then be provided from the memory device to the computer through a communication path.

At the time of implementing the function as the power disconnection packet analyzing unit 36 and the power disconnection unit 37, the program stored in the internal memory device (memory which is not illustrated in the first embodiment) is executed by a microprocessor (CPU 35 in the first embodiment) of the computer. At this time, the program recorded on the recording medium may be read and then be executed by the computer.

The power disconnection packet analyzing unit 36 analyzes the power disconnection packet received from the second receiving unit 32 of the LAN controller 30 and instructs the power disconnection unit 37 which will be described later to disconnect a power from the apparatus (storage apparatus 3).

The power disconnection unit 37 receives instruction of the power disconnection transmitted from the power disconnection packet analyzing unit 36 and instructs the power-supply apparatus 60 of the apparatus (storage apparatus 3) to disconnect a power.

[A-2] Packet Specifications

The storage apparatus 3 performs the power supply using a WOL function of the LAN controller 30 and performs the power disconnection using a power disconnection packet receiving function of the IPMI by the CPU 35.

Here, by using the WOL function of the LAN controller 30 during the power supply, the CPU 35 is not operated at a standby power (DC-OFF) state, and it is possible to perform the power supply of the storage apparatus 3 even in a case of not using the power supply packet receiving function of the IPMI by the CPU 35.

Further, according to this specifications, it is difficult to use the WOL function of the LAN controller 30 at a power supply (DC-ON) state, but it is possible to perform the power disconnection of the storage apparatus 3 by using the power disconnection packet receiving function of the IPMI during the power disconnection by the CPU.

The first receiving unit 31 waits for the power supply packet (magic packet), which is created by the power supply packet creating unit 26 of the server apparatus 2, by the WOL function at the standby power (DC-OFF) state.

Note that, the WOL function is an existing function and the detailed description thereof will not be presented. Moreover, the WOL function is provided as a standard in a general LAN controller. In order to supply the power, therefore, it is not necessary to provide new components to the LAN controller by using this function.

Meanwhile, when the storage apparatus 3 is in the DC-ON state, the CPU 35 is operable. Accordingly, by a power disconnection packet (IPMI packet) receiving function, the power disconnection packet analyzing unit 36 performs a standby of the power disconnection packet (IPMI packet), which is received from the server apparatus 2, through the second receiving unit 32.

Figure 2:
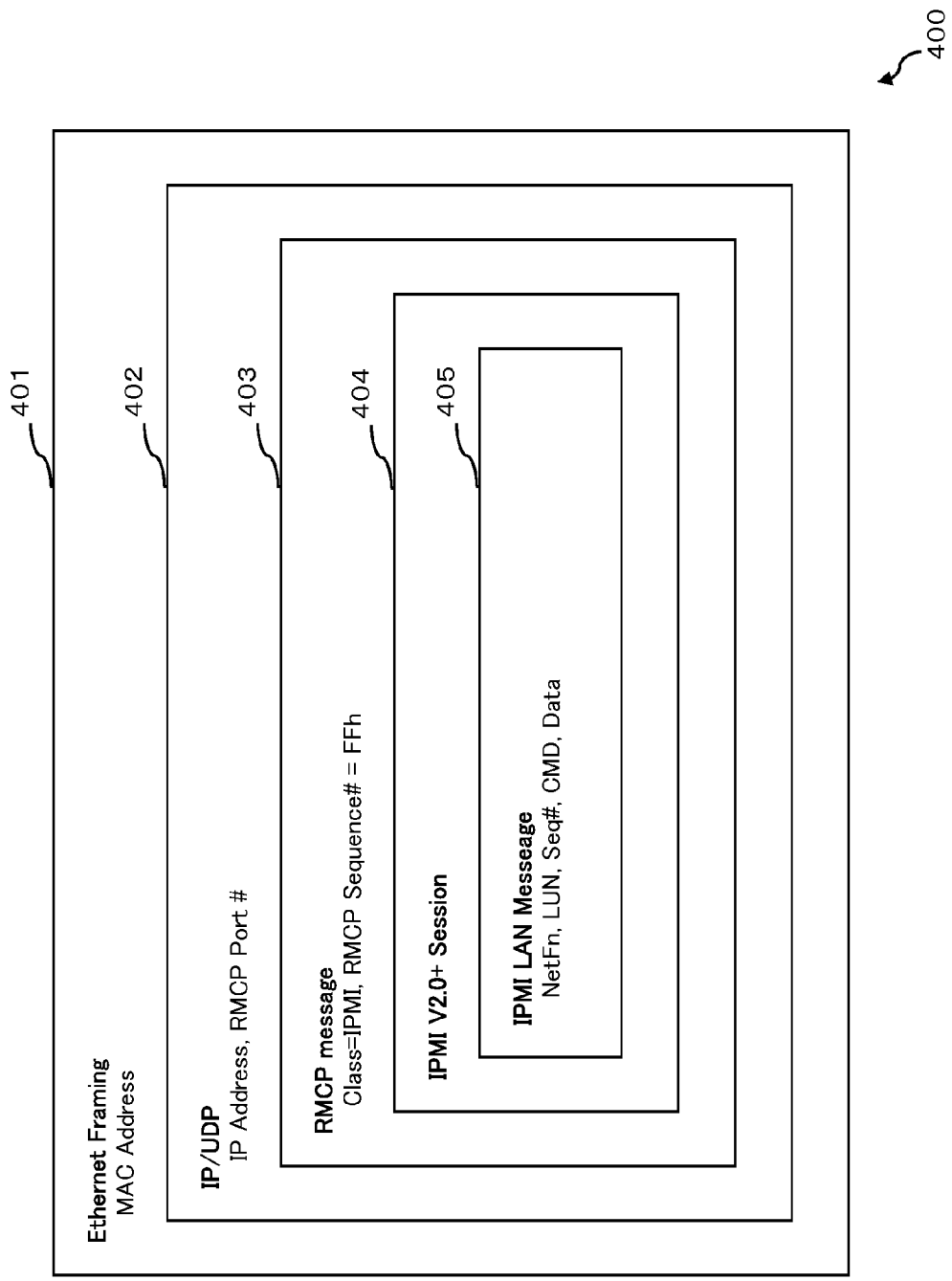
FIG. 2 is a diagram for describing a layer configuration of an IPMI packet used in the information processing system as an example of the first embodiment.

FIG. 2 is a diagram for describing a layer configuration of the IPMI packet used in the information processing system as an example of the first embodiment and FIG. 3 is a diagram for describing a data format of an IPMI LAN Message.

As illustrated in FIG. 2, an IPMI packet 400 includes Ethernet (registered trademark) Framing layer 401, IP/UDP layer 402, RMCP message layer 403, IPMI V2.0+Session layer 404, and IPMI LAN Message layer 405.

In this embodiment, the power control is carried out using the IPMI LAN Message layer 405.

As illustrated in FIG. 3, the IPMI LAN Message layer 405 includes each field of Target Address, NetFn, Target LUN, Header checksum, Source Address, SeqNo, Source LUN, Command code, Request Data, and Data checksum. Note that, since FIG. 3 illustrates the data format for request command (here, request command of power disconnection), the Request Data field is provided. In a case of a data format for response command, meanwhile, the IPMI LAN Message layer 405 includes a Response Data field instead of the Request Data field (see FIGS. 11 and 12 which will be described later).

At the time of performing the power disconnection of the storage apparatus 3, the power disconnection packet creating unit 27 of the server apparatus 2 creates a power disconnection packet which is a command according to the data format of the IPMI LAN Message illustrated in FIG. 3.

Specifically, in the data format of the IPMI LAN Message, the power disconnection packet creating unit 27 sets "NetFn field" to "00h=Chassis Request" and sets "Command code field" to "02h=Chassis Control". In the data format of the IPMI LAN Message, further, the power disconnection packet creating unit 27 sets "bit[3:0] chassis control of Request Data field" to "5h=Initiate a soft-shutdown of OS via ACPI by emulating a fatal over temperature" (see symbol B).

Note that, a method of setting other fields in the IPMI LAN Message layer 405 is an existing method and the detailed description thereof will not be presented.

In this way, further, the command created by the power disconnection packet creating unit 27 is called "Chassis Control Command" and is used to control the power disconnection of the storage apparatus 3.

[A-3] Power Control Processing

The power control processing in the information processing system as an example of the first embodiment configured as described above will be described with reference to a sequence diagram (processes 101 to 109) illustrated in FIG. 4.

As an initial state, the storage apparatus 3 is in the standby power (DC-OFF) state.

The power supply packet creating unit 26 of the server apparatus 2 creates the power supply packet (process 101) and delivers the created power supply packet to the first transmission unit 21. As described above, the power supply packet is the magic packet which uses the WOL function of the LAN controller 30 of the storage apparatus 3.

The first transmission unit 21 transmits the power supply packet received from the power supply packet creating unit 26 to the first receiving unit 31 of the storage apparatus 3 (process 102).

The first receiving unit 31 of the storage apparatus 3 receives and analyzes the power supply packet transmitted from the first transmission unit 21 of the server apparatus 2 (process 103). Further, the first receiving unit 31 instructs the power supply unit 33 to supply a power to the apparatus (storage apparatus 3).

The power supply unit 33 instructs the power-supply apparatus 60 to supply a power (process 104).

With the above processes, the storage apparatus 3 becomes the DC-ON state, thereby operating the CPU 35 of the storage apparatus 3.

When the server apparatus 2 disconnects the power of the storage apparatus 3, the power disconnection packet creating unit 27 of the server apparatus 2 creates the power disconnection packet (process 105) and delivers the created power disconnection packet to the second transmission unit 22. As described above, the power disconnection packet is the Chassis Control Command which uses the power disconnection packet receiving function of the IPMI.

The second transmission unit 22 transmits the power disconnection packet received from the power disconnection packet creating unit 27 to the second receiving unit 32 of the storage apparatus 3 (process 106).

The second receiving unit 32 of the storage apparatus 3 receives the power disconnection packet transmitted from the second transmission unit 22 of the server apparatus 2 (process 107) and delivers the received power disconnection packet to the power disconnection packet analyzing unit 36.

The power disconnection packet analyzing unit 36 analyzes the power disconnection packet received from the second receiving unit 32 (process 108) and instructs the power disconnection unit 37 to disconnect a power from the apparatus (storage apparatus 3).

The power disconnection unit 37 instructs the power-supply apparatus 60 to disconnect a power (process 109).

With the above processes, the storage apparatus 3 becomes the DC-OFF state, thereby stopping the operation of the CPU 35 of the storage apparatus 3.

[A-4] Effects

Thus, according to the information processing system 1 as the example of the first embodiment, since the storage apparatus 3 does not need the dedicated circuit chip which waits for the power supply packet of the IPMI, it is possible to reduce the component cost or the fabricating cost of the apparatus using the remote power control by the LAN.

Further, since the storage apparatus 3 can wait for the power supply packet at the power OFF state, it is possible to reduce the consumption power, resulting in reducing the operational cost.

Moreover, since the WOL function is a function provided as a standard in a general LAN controller, it is possible to perform the remote power control of the storage apparatus 3 without providing the above-described dedicated circuit chip or new components to the LAN controller, thereby improving reliability of the remote power control of the storage apparatus 3.

Further, when the server apparatus 2 and the storage apparatus 3 are connected one-to-one with each other, since the server apparatus 2 can perform the remote power control of the storage apparatus 3 with a simple configuration, it is possible to improve the reliability of the remote power control of the information processing system 1.

[B] Second Embodiment

A case will be considered, in which the above-described information processing system according to the first embodiment is provided with plural server apparatuses 2 and these plural server apparatuses 2 are cluster-connected to the storage apparatus 3.

Like this, in the information processing system 1 in which the plural server apparatus 2 is cluster-connected to the storage apparatus 3, power control processes will be described according to sequence diagrams (processes 201 to 214) illustrated in FIGS. 5 and 6. Note that, FIG. 5 illustrates the processes 201 to 207 and FIG. 6 illustrates the processes 208 to 214.

Figure 5:
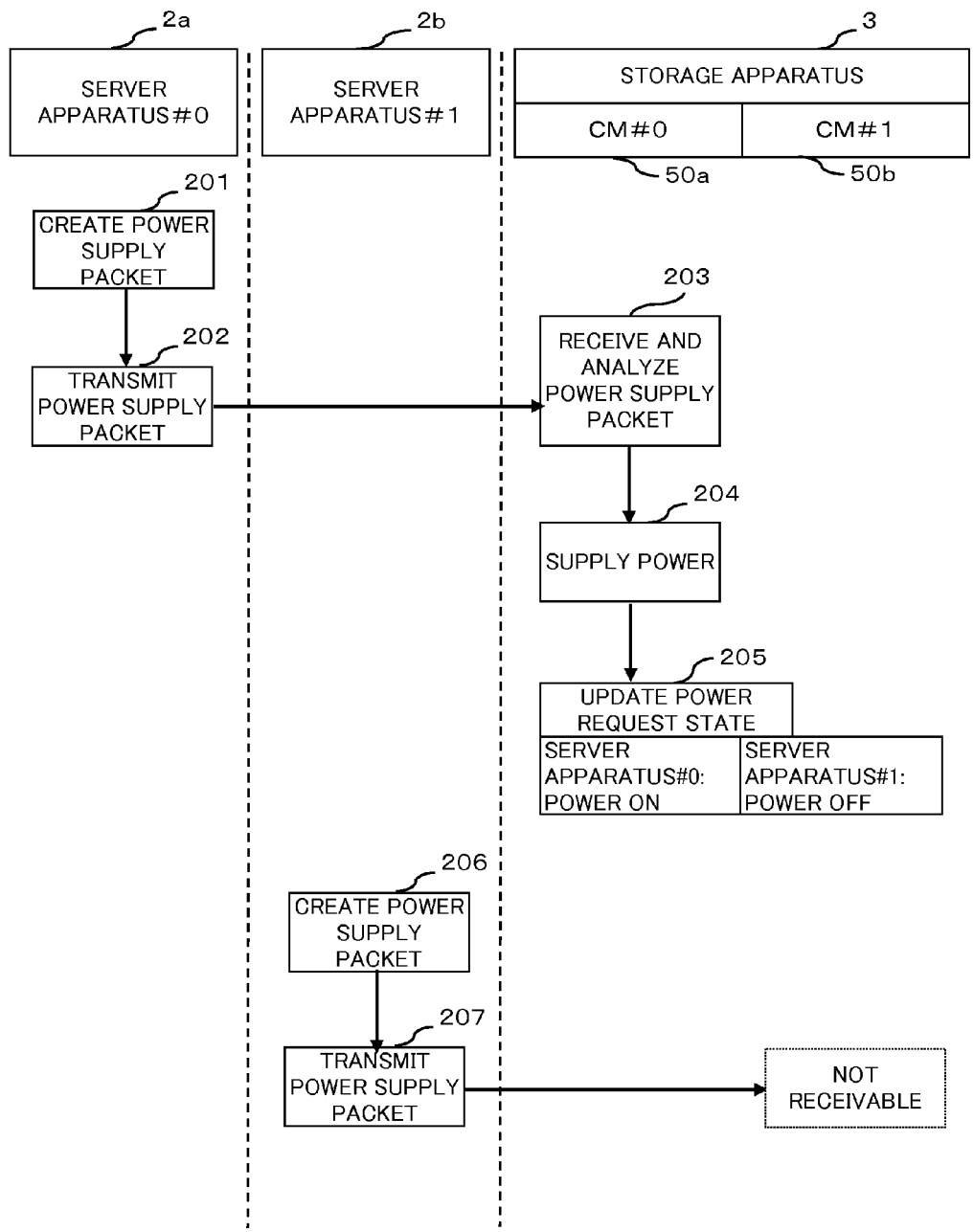
FIG. 5 is a diagram for describing a processing task of a power control in the information processing system which is cluster-connected.
Figure 6:
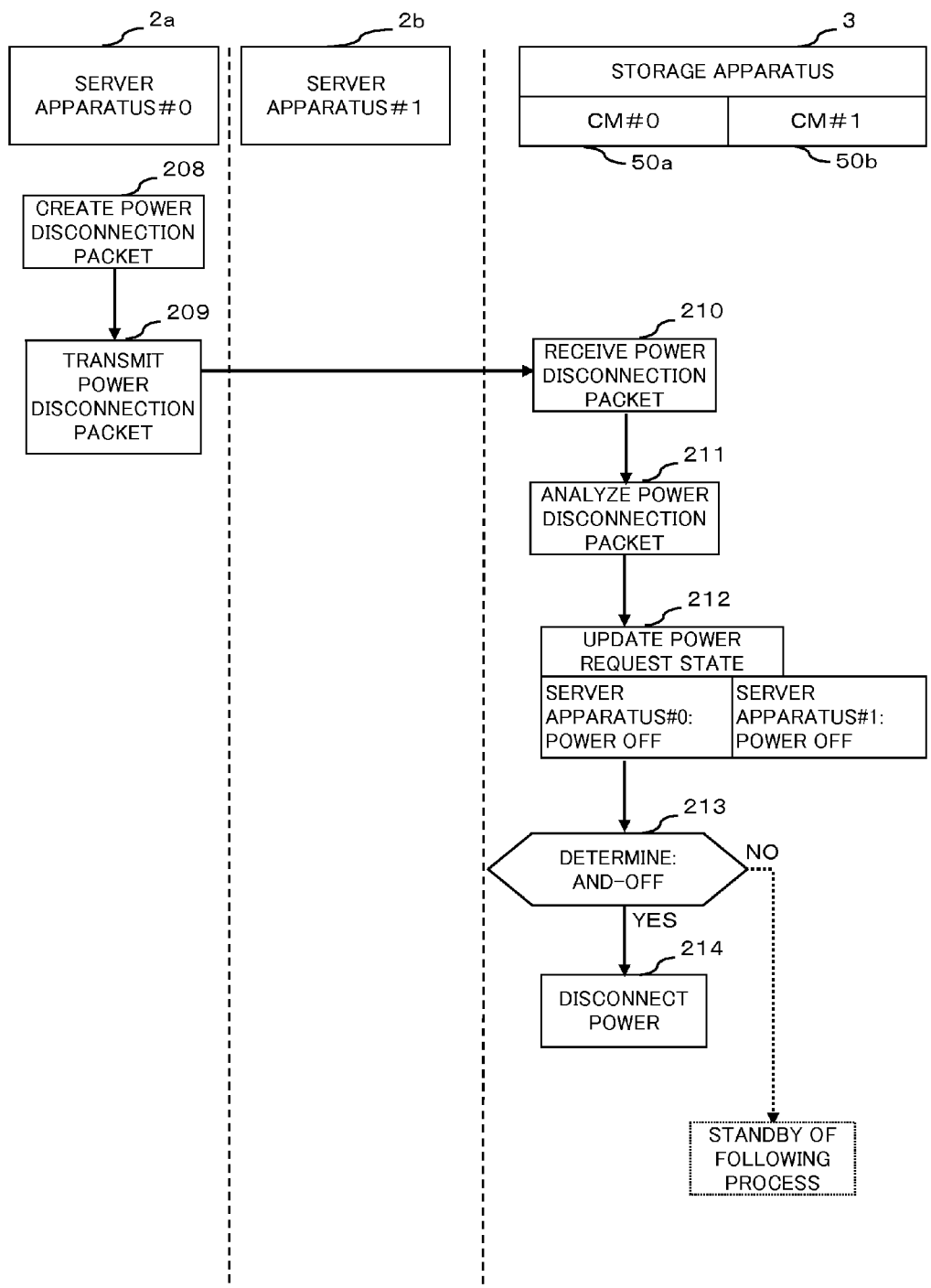
FIG. 6 is a diagram for describing a processing task of a power control in the information processing system which is cluster-connected.

In the examples illustrated in FIGS. 5 and 6, the information processing system is provided with two server apparatuses 2a and 2b and the storage apparatus 3, and the storage apparatus 3 is provided with two CMs 50a and 50b. These server apparatuses 2a and 2b are provided with the same configuration as the server apparatus 2 of the first embodiment. In addition, these CMs 50a and 50b are provided with the same configuration as the CM 50 of the first embodiment.

The server apparatus 2a and the CM 50a are communicably connected to each other through the LAN, and the server apparatus 2b and the CM 50b are communicably connected to each other through the LAN.

Hereinafter, the server apparatus 2a may be referred to as a server apparatus #0 and the server apparatus 2b may be referred to as a server apparatus #1. Further, the CM 50a may be referred to as a CM #0 and the CM 50b may be referred to as a CM #1, hereinafter.

Hereinafter, a specific server apparatus is represented as "server apparatus #0" or "server apparatus #1", but an arbitrary server apparatus is represented as "server apparatus 2". Further, a specific CM is represented as "CM #0" or "CM #1", but any arbitrary CM is represented as "CM 50".

As an initial state, the storage apparatus 3 is in the standby power (DC-OFF) state, and the storage apparatus 3 will not receive the power supply request from either server apparatus #0 or #1.

The power supply packet creating unit 26 of the server apparatus #0 creates the power supply packet (process 201 in FIG. 5). The power supply packet is the magic packet which uses the WOL function of the LAN controller 30 of the storage apparatus 3, as described above.

The server apparatus #0 transmits the created power supply packet to the CM #0 of the storage apparatus 3 (process 202 in FIG. 5).

In the storage apparatus 3, the CM #0 receives and analyzes the power supply packet transmitted from the server apparatus #0 (process 203 in FIG. 5). The CM #0 instructs the power supply unit 33 to supply a power to the storage apparatus 3.

The power supply unit 33 instructs the power-supply apparatus 60 to supply a power (process 204 in FIG. 5).

The storage apparatus 3 manages the power request received from each server apparatus 2 and updates the power request state received from the server apparatus #0 to "power ON" (process 205 in FIG. 5). Note that, in the storage apparatus 3, since the power supply request is not received from the server apparatus #1, the power request state is in "power OFF".

With the above processes, the storage apparatus 3 becomes DC-ON state and the CPU 35 of the storage apparatus 3 is operated.

Next, the power supply packet creating unit 26 of the server apparatus #1 creates the power supply packet (process 206 in FIG. 5). The power supply packet is also the magic packet which uses the WOL function of the LAN controller 30 of the storage apparatus 3.

The server apparatus #1 transmits the created power supply packet to the CM #1 of the storage apparatus 3 (process 207 in FIG. 5).

Here, since the CPU 35 of each CM 50 in the storage apparatus 3 is operated at DC-ON state, the first receiving unit 31 of the CM #1 does not receive the power supply packet serving as the magic packet. Therefore, the power request state stored in a memory 51 of each CM 50 is maintained at the state updated in the process 205. That is, even though the server apparatus #1 performs the power supply request on the storage apparatus 3, the power supply request performed by the server apparatus #1 is not reflected in the storage apparatus 3.

The power disconnection packet creating unit 27 of the server apparatus #0 creates the power disconnection packet (process 208 in FIG. 6). As described above, the power disconnection packet is the Chassis Control Command which uses the power disconnection packet receiving function of the IPMI by the CPU 35.

The server apparatus #0 transmits the created power disconnection packet to the CM #0 of the storage apparatus 3 (process 209 in FIG. 6).

In the storage apparatus 3, the CM #0 receives the power disconnection packet transmitted from the server apparatus #0 (process 210 in FIG. 6) and analyzes the received power disconnection packet (process 211 in FIG. 6). The storage apparatus 3 updates the power request state of the server apparatus #0 under the management (process 212 in FIG. 6). That is, the storage apparatus 3 updates the power request state of the server apparatus #0 to "power OFF". Meanwhile, the power request state of the server apparatus #1 is still maintained at "power OFF".

The storage apparatus 3 determines that the power disconnection request is made (AND-OFF) from all server apparatuses 2 with reference to the power request state of each of the server apparatuses #0 and #1 under the management (process 213 in FIG. 6).

Here, when the power request state of all server apparatuses 2 is in "power OFF" (see YES route of process 213 in FIG. 6), the storage apparatus 3 performs the power disconnection (process 214 in FIG. 6). The reason is that the process of the server apparatus 2 begins to include problem when the storage apparatus 3 performs the power disconnection at the state in which the power disconnection request is not received from some of the server apparatuses 2. Accordingly, the storage apparatus 3 waits for a following process when the power request state of all server apparatus 2 is not in "power OFF" (see NO route of process 213 in FIG. 6).

In the example illustrated in FIGS. 5 and 6, as illustrated in the process 212, the power request state of all server apparatuses 2 including each server apparatus #0 or #1 which is managed by the storage apparatus 3 is in "power OFF".

Therefore, the server apparatus #1 performs the power supply request on the storage apparatus 3 in the process 207, or even though the storage apparatus 3 does not perform the power disconnection request, the power disconnection is performed.

Like this, in case that the plural server apparatuses 2 are simply provided to the information processing system according to the first embodiment and that the plural server apparatuses 2 are cluster-connected to the storage apparatus 3, it is concerned that the storage apparatus 3 does not accurately treat the power request received from each server apparatus 2.

In the information processing system as the example of the second embodiment, even when the plural server apparatuses 2 are cluster-connected to the storage apparatus 3, a method capable of accurately treating the power request received from each server apparatus 2 is provided.

[B-1] System Configuration

Figure 7:
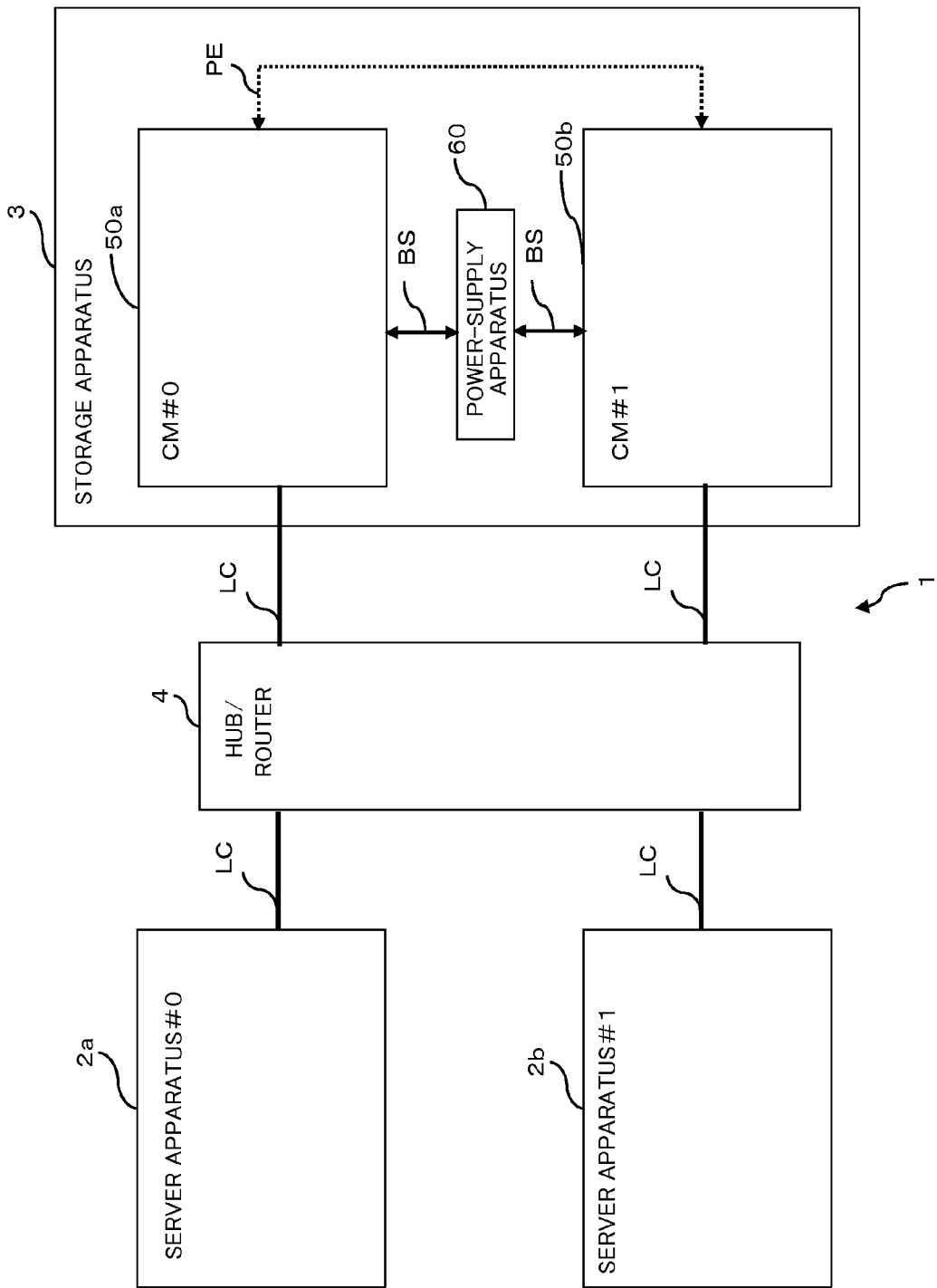
FIG. 7 is a diagram illustrating a configuration of an information processing system as an example of a second embodiment.

FIG. 7 is a diagram illustrating a configuration of an information processing system as an example of the second embodiment, FIG. 8 is a diagram illustrating a configuration of such server apparatus, and FIG. 9 is a diagram illustrating a configuration of a control module.

In the drawings, since each symbol identical to the above-described symbols indicates a portion identical to or corresponding to the above-described each symbol, the detailed description thereof will not be presented below.

As illustrated in FIG. 7, the information processing system 1 includes server apparatuses (higher-level apparatuses) 2a and 2b, a storage apparatus (information processing apparatus) 3, and a hub (relay apparatus) 4. Note that, the hub 4 may be a router.

Here, the server apparatus #0 and the server apparatus #1 include the same configuration.

As illustrated in FIG. 8, the server apparatus 2 includes a LAN controller (communication control apparatus, communication control unit) 20, a CPU (control apparatus) 25, and a storage unit (first storage unit, memory) 12. Note that, two server apparatuses 2 are provided in FIG. 7, but the embodiment is not limited thereto and may be provided with three or more server apparatuses 2.

The storage unit (memory) 12 is a memory device including Read Only Memory (ROM) and Random Access Memory (RAM). An Operating System (OS), a software program related to the power control, or data types for this program is written on the ROM of the storage unit 12. The software program on the storage unit 12 is appropriately read and executed by the CPU 25. The RAM of the storage unit 12 is used as a primary recording memory or a working memory.

As will be described later, the storage unit 12 stores information (power supply request state) indicating that apparatus (server apparatus 2) performs a power supply request on the storage apparatus 3 and information (power disconnection request state) indicating that apparatus (server apparatus 2) performs a power disconnection request on the storage apparatus 3, by a power management unit 11, as a power request state.

The CPU 25 includes the power management unit 11, a power supply packet creating unit 26, a power disconnection packet creating unit 27, a power confirmation packet creating unit 28, and an IPMI power supply packet creating unit 29.

That is, the CPU 25 according to the second embodiment further has functions as the power management unit 11, the power confirmation packet creating unit 28, and the IPMI power supply packet creating unit 29 in addition to the function of the CPU 25 according to the first embodiment.

The power management unit 11 has a function of managing the power state (power request state) of the storage apparatus 3.

Specifically, the power management unit 11 recognizes that the apparatus (server apparatus 2) performs the power supply request on the storage apparatus 3 when the power supply packet creating unit 26 creates the power supply packet and allows information indicating that the storage apparatus 3 is in the power ON as a power supply request state to be stored in the storage unit 12. Further, the power management unit 11 analyzes a power confirmation response packet received from the storage apparatus 3 by a third receiving unit 19, which will be described later, of the LAN controller 20. Moreover, the power management unit 11 determines whether the power request state stored in a memory 51, which will be described later, of the storage apparatus 3 is consistent with that stored in the storage unit 12 of the apparatus (server apparatus 2) based on the analyzed power confirmation response packet. When the power request states are not consistent with each other, the power management unit 11 instructs the IPMI power supply packet creating unit 29 to create the power supply packet. When the power disconnection packet creating unit 27 creates the power disconnection packet, the power management unit 11 recognizes that the apparatus (server apparatus 2) performs the power disconnection request on the storage apparatus 3 and allows the information indicating that the storage apparatus 3 is in the "power OFF" as a power disconnection request state to be stored in the storage unit 12.

The power confirmation packet creating unit 28 creates a power confirmation request packet when a first transmission unit 21 of the LAN controller 20 transmits the power supply packet to the storage apparatus 3. In addition, the power confirmation packet creating unit 28 delivers the created power confirmation request packet to a third transmission unit 23, which will be described later, of the LAN controller 20.

Note that, the details of the power confirmation request packet will be described later using FIG. 10.

The IPMI power supply packet creating unit 29 creates the power supply packet by a Chassis Control Command of an IPMI packet according to an instruction from the power management unit 11. Further, the IPMI power supply packet creating unit 29 delivers the created power supply packet to a fourth transmission unit 24, which will be described later, of the LAN controller 20.

The LAN controller 20 includes the first transmission unit 21, a second transmission unit 22, the third transmission unit 23, the fourth transmission unit 24, and the third receiving unit 19.

That is, the LAN controller 20 of the second embodiment further has functions as the third transmission unit 23, the fourth transmission unit 24, and the third receiving unit 19 in addition to the function of the LAN controller of the first embodiment.

The third transmission unit 23 transmits the power confirmation request packet created by the power confirmation packet creating unit 28 to the storage apparatus 3.

The fourth transmission unit 24 transmits the power supply packet created by the IPMI power supply packet creating unit 29 to the storage apparatus 3.

The third receiving unit 19 receives a power confirmation response packet transmitted from the storage apparatus 3 and delivers it to the power management unit 11.

Note that, details of the power confirmation response packet will be described later using FIGS. 11 and 12.

As illustrated in FIG. 7, the storage apparatus 3 includes a CM 50*a*, a CM50*b*, and a power-supply apparatus 60.

Each CM 50 and the power-supply apparatus 60 are communicably connected to each other through a bus line BS.

Further, a CM #0 and a CM #1 are communicably connected to each other through a Peripheral Component Interconnect Express (PCIe) PE, for example.

The CM #0 and the CM #1 mutually include the same configuration.

The CM 50 is provided by the number of the server apparatuses 2. Therefore, two CMs 50 are illustrated in FIG. 7 as an example.

As illustrated in FIG. 9, the CM 50 includes a LAN controller (communication control apparatus, communication control unit) 30, a CPU (control apparatus) 35, and a memory 51.

The LAN controller 30 includes a first receiving unit 31, a second receiving unit 32, a power supply unit 33, and a fifth transmission unit 34.

In the second embodiment, the first receiving unit 31 has functions of notifying that the power supply packet has been received to a power management unit 38, which will be described later, of the CPU 35 in addition to the function as an example of the above-described first embodiment.

The second receiving unit 32 has functions of receiving the power confirmation request packet transmitted from the third transmission unit 23 of the server apparatus 2 and the IPMI power supply packet transmitted by the fourth transmission unit 24 and delivering these packets to the power management unit 38 of the CPU 35 in addition to the function as an example of the above-described first embodiment.

The power supply unit 33 instructs the power-supply apparatus 60 to supply power.

The fifth transmission unit 34 transmits a power confirmation response packet created by the power management unit 38, which will be described later, of the CPU 35 to the server apparatus 2.

The CPU 35 includes a power disconnection packet analyzing unit 36, a power disconnection unit 37, a power management unit 38, and a confirmation unit 39.

That is, the CPU 35 of the second embodiment further has functions as the power management unit 38 and the confirmation unit 39 in addition to the function of the CPU 35 of the first embodiment.

The power disconnection packet analyzing unit 36 has functions of notifying that the power disconnection packet has been received to the power management unit 38 in addition to the function as an example of the above-described first embodiment. Note that, the power disconnection packet analyzing unit 36 does not directly perform the instruction of the power disconnection on the power disconnection unit 37, unlike the power disconnection packet analyzing unit 36 of the first embodiment.

The power management unit 38 allows the notification received from the first receiving unit 31 to be stored in a power supply storage unit 52, which will be described later, of the memory 51 as a power supply request state in association with the server apparatus 2 which is a transmission source of the received notification. In addition, the power management unit 38 allows the notification received from the power disconnection packet analyzing unit 36 to be stored in a power disconnection storage unit 53, which will be described later, of the memory 51 as a power disconnection request state in association with the server apparatus 2 which is a transmission source of the received notification. Note that, when the power supply request state of the server apparatus 2 is stored in the power supply storage unit 52, the power management unit 38 deletes the power disconnection request state of the corresponding server apparatus 2 from the power disconnection storage unit 53. Further, when the power disconnection request state of the server apparatus 2 is stored in the power disconnection storage unit 53, the power management unit 38 deletes the power supply request state of the corresponding server apparatus 2 from the power supply storage unit 52.

The power management unit 38 has a function of analyzing the power confirmation request packet received by the second receiving unit 32, a function of creating the power confirmation response packet addressed to the server apparatus 2, and a function of analyzing the IPMI power supply packet.

The power management unit 38 confirms the power request state of the server apparatus 2 that has issued the power confirmation request packet with reference to the power supply storage unit 52 and the power disconnection storage unit 53, based on the analyzed power confirmation request packet.

In addition, the power management unit 38 creates the power confirmation request packet serving as the IPMI packet addressed to the server apparatus 2 based on the confirmed power request state and delivers it to the fifth transmission unit 34.

Further, the power management unit 38 allows the power supply request state of the server apparatus 2, which has issued the IPMI power supply packet, to be stored in the power supply storage unit 52 based on the analyzed IPMI power supply packet. In addition, the power management unit 38 deletes the power disconnection request state of the server apparatus 2, which has issued the IPMI power supply packet, from the power disconnection storage unit 53.

That is, the power management unit 38 also functions as the power confirmation packet analyzing unit, the power confirmation packet creating unit, and the IPMI power supply packet analyzing unit.

The confirmation unit 39 confirms whether the storage apparatus 3 receives the power disconnection packet from all of the server apparatuses 2 with reference to the power disconnection storage unit 53, which will be described later, of the memory 51. When the storage apparatus 3 receives the power disconnection packet from all of the server apparatuses 2, the confirmation unit 39 instructs the power disconnection unit 37 to perform the power disconnection of the apparatus (storage apparatus 3).

The memory 51 is a memory device including ROM and RAM. The OS, a software program related to the power control, or data types for this program is written on the ROM of the memory 51. The software program on the memory 51 is appropriately read and executed by the CPU 35. The RAM of the memory 51 is used as a primary recording memory or a working memory.

The memory 51 is provided with the power supply storage unit 52 and the power disconnection storage unit 53.

The power supply storage unit 52 stores the power supply request state received from the power management unit 38 in association with each server apparatus 2 which is the transmission source.

The power disconnection storage unit 53 stores the power disconnection request state received from the power management unit in association with each server apparatus 2 which is the transmission source.

Note that, as illustrated in FIG. 7, the CM #0 and the CM #1 are communicably connected to each other through the PCIe PE, and the memories 51 of both CMs 50 notify each other of the power supply request state and the power disconnection request state, which are stored in each memory. That is, the power supply storage unit 52 of the CM #0 concurrently stores the power supply request state from the server apparatus #0 to the CM #0 and the power supply request state from the server apparatus #1 to the CM #1. The power supply storage unit 52 of the CM #1 is the same. In addition, the power disconnection storage unit 53 of the CM #0 concurrently stores the power disconnection request state from the server apparatus #0 to the CM #0 and the power disconnection request state from the server apparatus #1 to the CM #1. The power disconnection storage unit 53 of the CM #1 is the same.

With these reasons, it is possible to know the power supply request state and the power disconnection request state received from each server apparatus with reference to the power supply storage unit 52 and the power disconnection storage unit 53. [B-2] Packet Specifications FIGS. 10 to 12 are diagrams for describing a data format of an IPMI LAN Message.

In the second embodiment, the power confirmation packet creating unit 28 creates an IPMI packet according to the data format illustrated in FIG. 10 as the power confirmation request packet so as to perform the power confirmation request on the storage apparatus 3.

Here, the specification of the IPMI packet is the same as in the first embodiment, and the detailed description will not be presented.

Specifically, as illustrated in FIG. 10, the power confirmation packet creating unit 28 sets "NetFn field" to "00h=Chassis Request" and sets "Command code field" to "01h=Get Chassis Status" in the data format of the IPMI LAN Message. Further, the power confirmation packet creating unit 28 sets a "Request Data field" to a "null" in the data format of the IPMI LAN Message.

In this way, a command created by the power confirmation packet creating unit 28 is called a "Get Chassis Status Command".

In addition, the power management unit 38 of the storage apparatus 3, which has received the power confirmation request packet from the server apparatus 2, creates the Get Chassis Status Command as the power confirmation response packet in accordance with the data format of the IPMI packet illustrated in FIGS. 11 and 12.

Note that, since the FIGS. 11 and 12 illustrate the data format for a response command (here, response command of power confirmation), a Response Data field is provided, unlike FIG. 3.

Specifically, as illustrated in FIG. 11, the power management unit 38 sets the "NetFn field" to the "01h=Chassis Response" and sets the "Command code field" to the "01h=Get Chassis Status" in the data format of the IPMI LAN Message. Further, the power management unit 38 sets "bit[0] Power is on" of Current Power State field of Response Data in the data format of the IPMI LAN Message. Here, the power management unit 38 sets "bit[0] Power is on" to "1b=system power is on" with reference to the power supply storage unit 52 and the power disconnection storage unit 53, when the power request state of the server apparatus 2 for performing the power confirmation request is in "power ON" (see symbol C). Meanwhile, the power management unit 38 sets "bit[0] Power is on" to "0b=system power is off", when the power request state of the server apparatus 2 for performing the power confirmation request is in "power OFF" (see symbol D).

In addition, even though the server apparatus 2 performs the power supply request by the magic packet, when the power request state from the server apparatus 2, which is stored in the memory 51 of the storage apparatus 3, is in "power OFF", the IPMI power supply packet creating unit 29 creates the Chassis Control Command of the IPMI packet.

Specifically, as illustrated in FIG. 3, the IPMI power supply packet creating unit 29 sets the "NetFn field" to the "00h=Chassis Request" and sets the "Command code field" to the "02h=Chassis Control" in the data format of the IPMI LAN Message. Further, the IPMI power supply packet creating unit 29 sets "bit[3:0] cassis control" of Request Data field to "1h=power up" in the data format of the IPMI LAN Message (see symbol A).

[B-3] Power Control Processing

FIGS. 13 to 17 are diagrams for describing processing of the power control in the information processing system as an example of the second embodiment, respectively.

Figure 14:
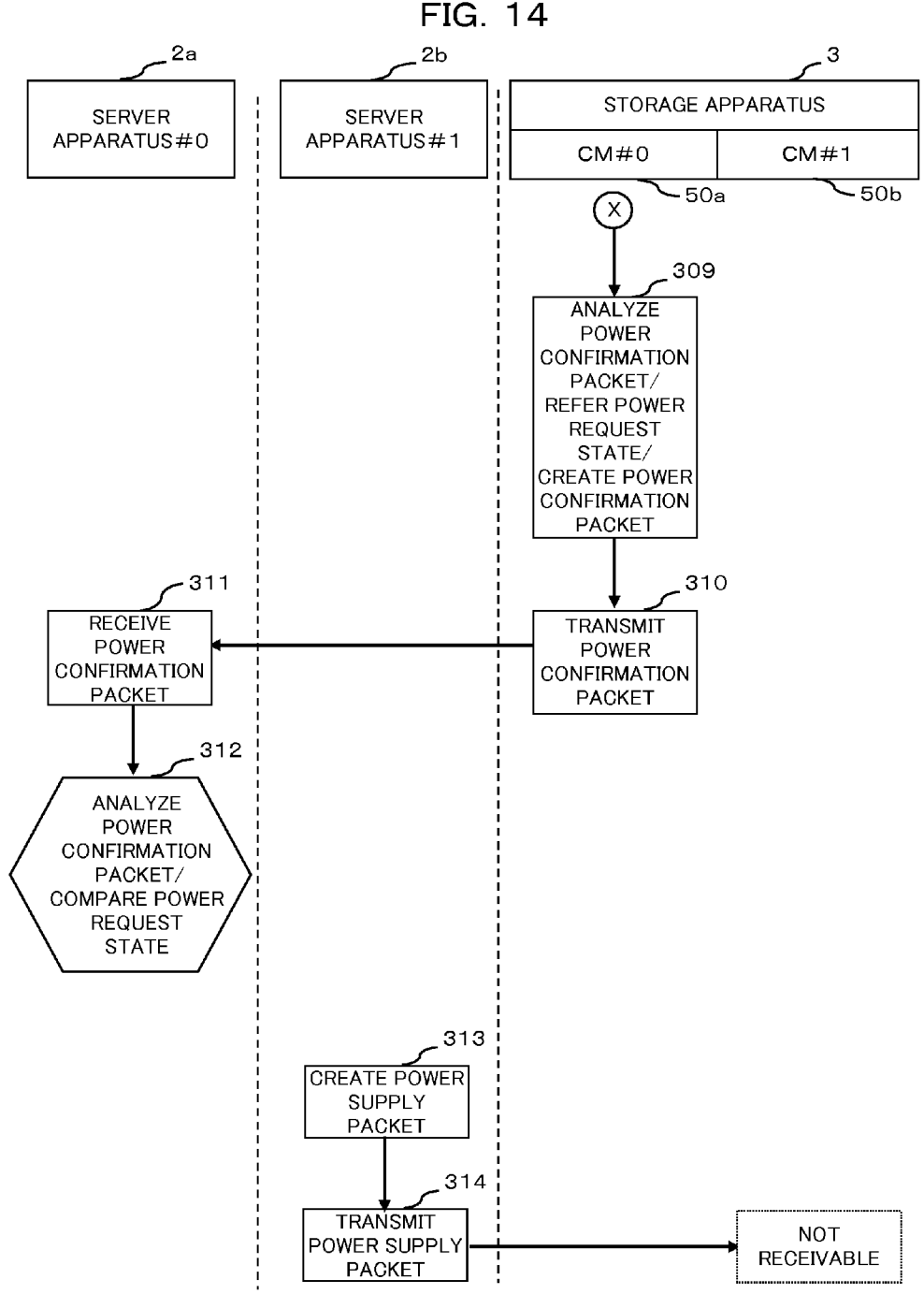
FIG. 14 is a diagram for describing processing of a power control in the information processing system as an example of the second embodiment.
Figure 15:
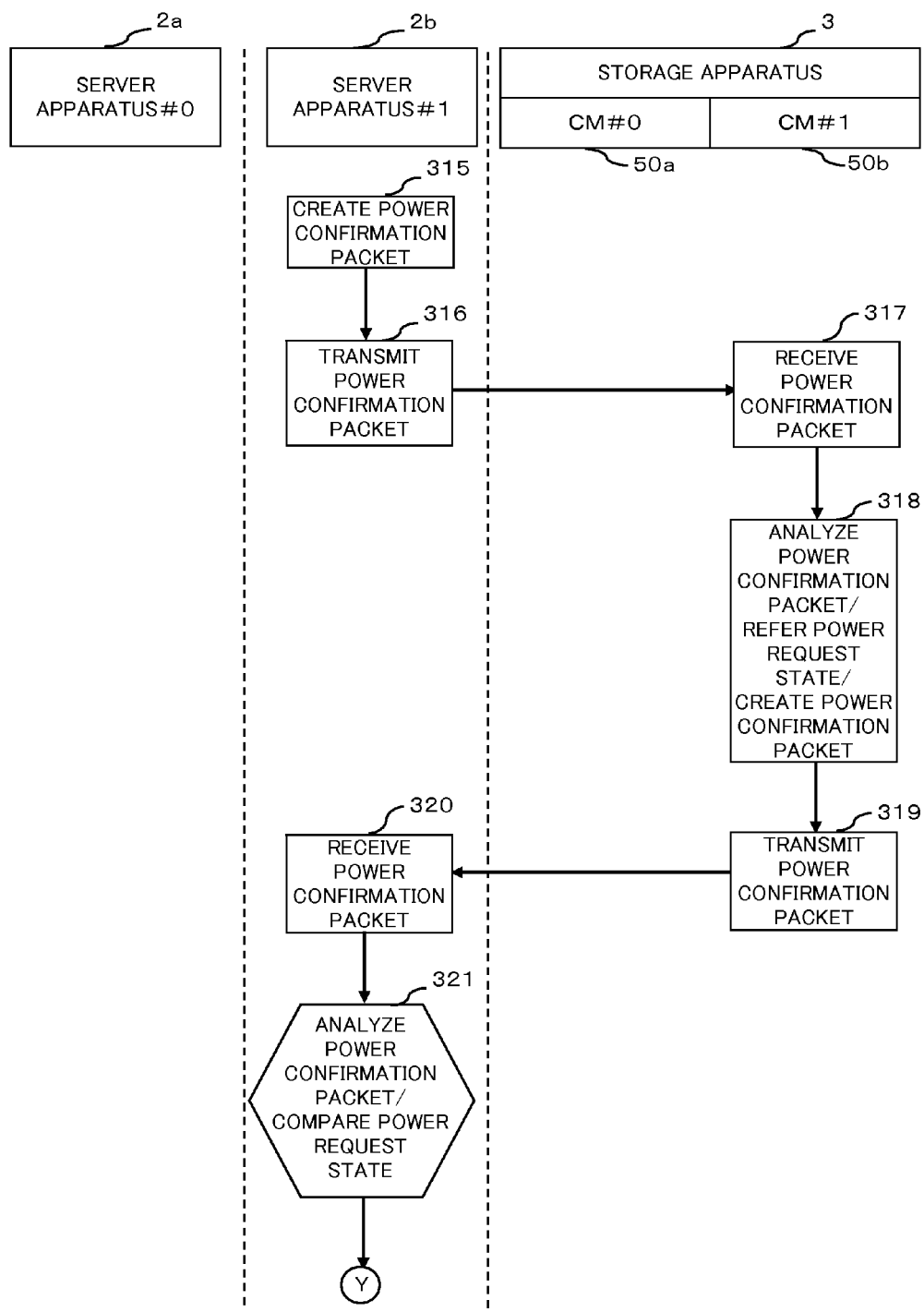
FIG. 15 is a diagram for describing processing of a power control in the information processing system as an example of the second embodiment.
Figure 16:
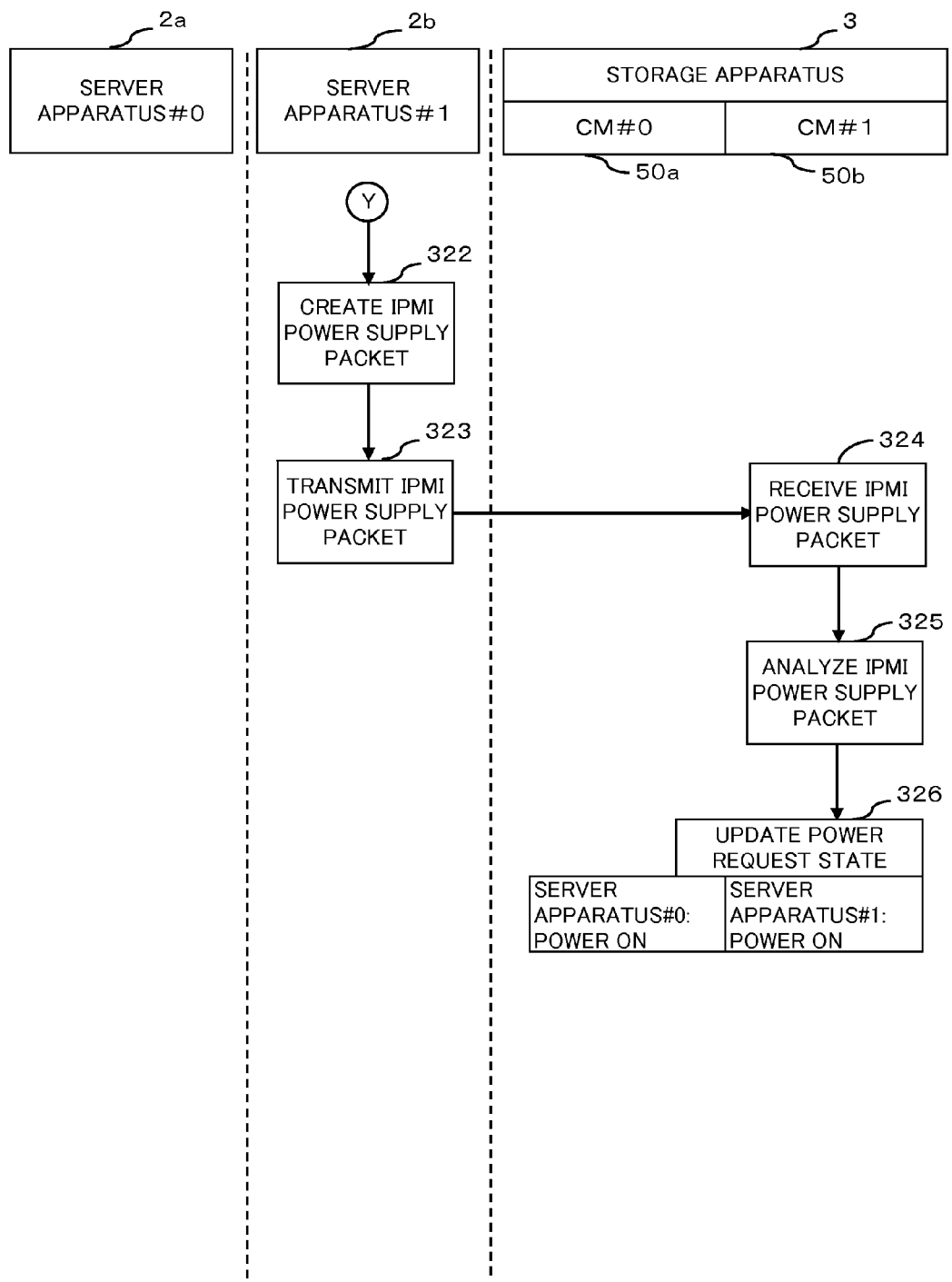
FIG. 16 is a diagram for describing processing of a power control in the information processing system as an example of the second embodiment.

The power control processing in the information processing system, configured as described above, as an example of the second embodiment will be described with reference to sequence diagrams (processes 301 to 333) illustrated in FIGS. 13 to 17. Note that, FIG. 13 illustrates the processes 301 to 308, FIG. 14 illustrates the processes 309 to 314, FIG. 15 illustrates the processes 315 to 321, FIG. 16 illustrates the processes 322 to 326, and FIG. 17 illustrates the processes 327 to 333.

As an initial state, it is assumed that the storage apparatus 3 is in the standby power (DC-OFF) state, and the storage apparatus 3 has not received the power supply request yet from either server apparatus 2.

The power supply packet creating unit 26 of the server apparatus #0 creates the power supply packet (process 301 in FIG. 13) and delivers the created power supply packet to the first transmission unit 21. The power supply packet is the magic packet which uses the WOL function of the LAN controller 30 of the storage apparatus 3. Note that, the power management unit 11 recognizes that the apparatus (server apparatus #0) performs the power supply request on the storage apparatus 3 at the time of creating the power supply packet and allows information (hereinafter, simply referred to as "power ON") indicating the "power ON" as a power request state to be stored in the storage unit 12.

Figure 13:
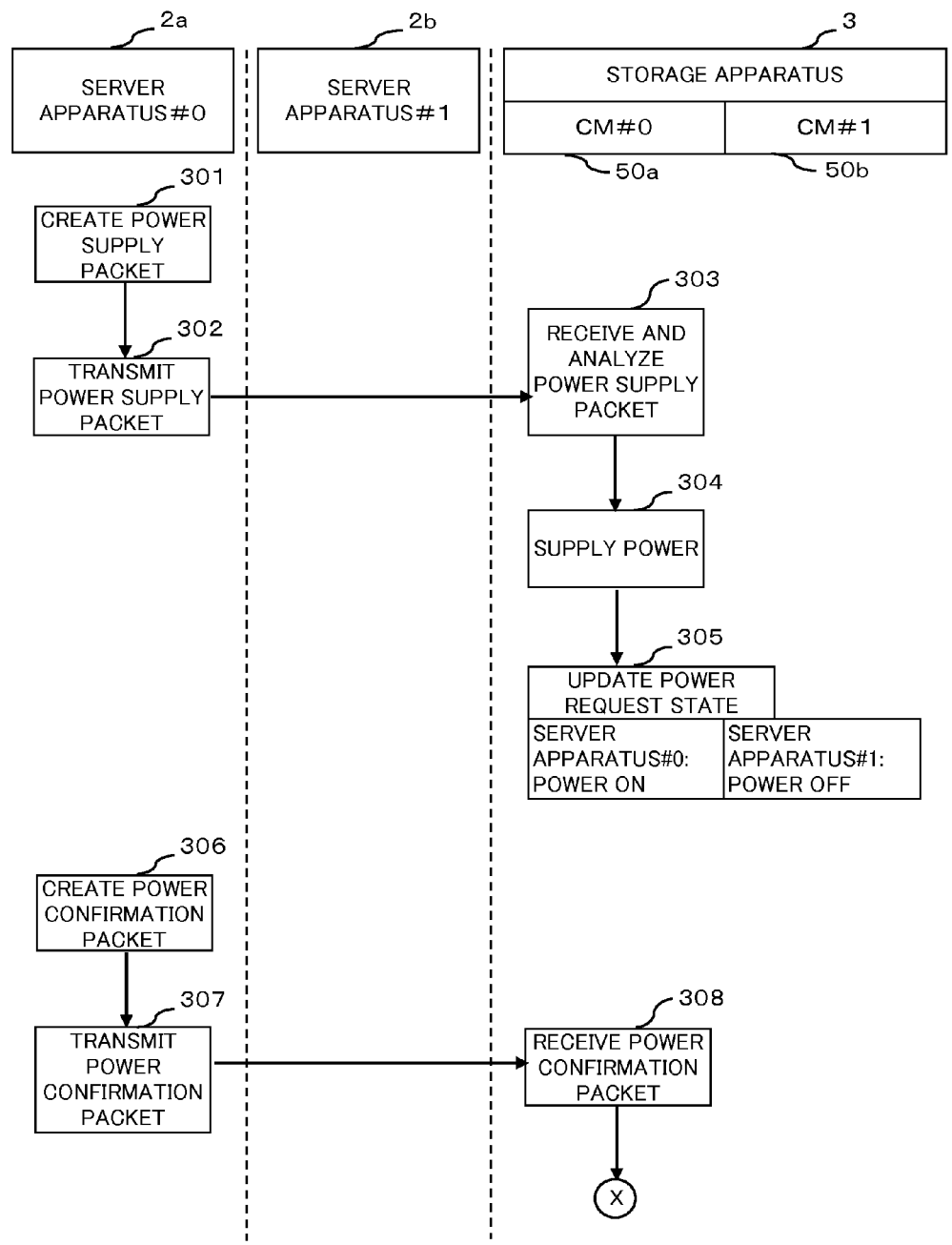
FIG. 13 is a diagram for describing processing of a power control in the information processing system as an example of the second embodiment.

The first transmission unit 21 transmits the power supply packet received from the power supply packet creating unit 26 to the first receiving unit 31 of the CM #0 (process 302 in FIG. 13).

The first receiving unit 31 of the CM #0 receives and analyzes the power supply packet transmitted from the first transmission unit 21 of the server apparatus #0 (process 303 in FIG. 13). Further, the first receiving unit 31 instructs the power supply unit 33 to supply power to the apparatus (storage apparatus 3). Moreover, the first receiving unit 31 notifies that the power supply packet has been received to the power management unit 38.

The power supply unit 33 instructs the power-supply apparatus 60 to supply power (process 304 in FIG. 13).

The power management unit 38 receives the notification of the power supply request state from the first receiving unit 31 and updates the power request state of the server apparatus #0, which is stored in the power supply storage unit 52 and the power disconnection storage unit 53 of the memory 51 (process 305 in FIG. 13). With the process 305, the power request state of the server apparatus #0 is updated to "power ON" and the power request state of the server apparatus #1 is maintained at "power OFF".

With the above processes, the storage apparatus 3 becomes the DC-ON state, thereby operating the CPU 35 of the storage apparatus 3.

Next, the power confirmation packet creating unit 28 of the server apparatus #0 creates the power confirmation request packet (process 306 in FIG. 13) and delivers it to the third transmission unit 23. Such power confirmation request packet, as described above, is the Get Chassis Status Command which uses the power confirmation packet receiving function of the IPMI by the CPU 35.

The third transmission unit 23 transmits the power confirmation request packet received from the power confirmation packet creating unit 28 to the second receiving unit 32 of the CM #0 (process 307 in FIG. 13).

The second receiving unit 32 of the CM #0 receives the power confirmation request packet transmitted from the third transmission unit 23 of the server apparatus #0 (process 308 in FIG. 13) and delivers the received power confirmation request packet to the power management unit 38.

The power management unit 38 analyzes the power confirmation request packet received from the second receiving unit 32 and refers to the power request state stored in the power supply storage unit 52 and the power disconnection storage unit 53. Further, the power management unit 38 creates the power confirmation response packet based on the referenced power request state (process 309 in FIG. 14). Then, the power management unit 38 delivers the created power confirmation response packet to the fifth transmission unit 34. The power confirmation response packet is the Get Chassis Status Command which uses the power confirmation packet receiving function of the IPMI by the CPU 25, as described above.

The fifth transmission unit 34 transmits the power confirmation response packet received from the power management unit 38 to the third receiving unit 19 of the server apparatus #0 (process 310 in FIG. 14).

The third receiving unit 19 of the server apparatus #0 receives the power confirmation response packet transmitted from the fifth transmission unit 34 of the CM #0 (process 311 in FIG. 14) and delivers the received power confirmation response packet to the power management unit 11.

The power management unit 11 analyzes the power confirmation response packet received from the third receiving unit 19 and compares the power request state stored in the memory 51 of the CM #0 with the power request state stored in the storage unit 12 of the apparatus (server apparatus #0) (process 312 in FIG. 14). Here, since the power request state stored in the memory 51 of the CM #0 is in "power ON" and the power request state stored in the storage unit 12 of the apparatus (server apparatus #0) is also in "power ON", both power request states are consistent with each other. Therefore, the server apparatus #0 terminates the power supply processing of the server apparatus 2.

Next, the power supply packet creating unit 26 of the server apparatus #1 creates the power supply packet (process 313 in FIG. 14) and delivers the created power supply packet to the first transmission unit 21. The power supply packet is the magic packet which uses the WOL function of the LAN controller 30 of the storage apparatus 3, as described above. Note that, the power management unit 11 recognizes that the apparatus (server apparatus #1) performs the power supply request on the storage apparatus 3 at the time of creating the power supply packet and allows "power ON" as a power request state to be stored in the storage unit 12.

The first transmission unit 21 transmits the power supply packet received from the power supply packet creating unit 26 to the first receiving unit 31 of the CM #1 (process 314 in FIG. 14).

Here, since the CPU 35 of each CM 50 in the storage apparatus 3 is operated with DC-ON state, the first receiving unit 31 of the CM #1 will not receive the power supply packet serving as the magic packet. Therefore, the power request state stored in the memory 51 of each CM 50 is maintained at the state updated with the process 305 in FIG. 13. That is, even though the server apparatus #1 performs the power supply request on the storage apparatus 3, the power supply request performed by the server apparatus #1 is not reflected in the storage apparatus 3.

The power confirmation packet creating unit 28 of the server apparatus #1 creates the power confirmation request packet (process 315 in FIG. 15) and delivers the created power confirmation request packet to the third transmission unit 23. The power confirmation request packet is the Get Chassis Status Command which uses the power confirmation request packet receiving function of the IPMI by the CPU 35, as described above.

The third transmission unit 23 transmits the power confirmation request packet received from the power confirmation packet creating unit 28 to the second receiving unit 32 of the CM #1 (process 316 in FIG. 15).

The second receiving unit 32 of the CM #1 receives the power confirmation request packet transmitted from the third transmission unit 23 of the server apparatus #1 (process 317 in FIG. 15) and delivers the received power confirmation request packet to the power management unit 38.

The power management unit 38 analyzes the power confirmation request packet received from the second receiving unit 32 and refers to the power request state stored in the power supply storage unit 52 and the power disconnection storage unit 53. Further, the power management unit 38 creates the power confirmation response packet based on the referenced power request state (process 318 in FIG. 15). Then, the power management unit 38 delivers the created power confirmation response packet to the fifth transmission unit 34. The power confirmation response packet is the Get Chassis Status Command which uses the power confirmation response packet receiving function of the IPMI by the CPU 25, as described above.

The fifth transmission unit 34 transmits the power confirmation response packet received from the power management unit 38 to the third receiving unit 19 of the server apparatus #1 (process 319 in FIG. 15).

The third receiving unit 19 of the server apparatus #1 receives the power confirmation response packet transmitted from the fifth transmission unit 34 of the CM #1 (process 320 in FIG. 15) and delivers the received power confirmation response packet to the power management unit 11.

The power management unit 11 analyzes the power confirmation response packet received from the third receiving unit 19 and compares the power request state stored in the memory 51 of the CM #1 with the power request state stored in the storage unit 12 of the apparatus (server apparatus #1) (process 321 in FIG. 15). Here, since the power request state stored in the memory 51 of the CM #1 is in "power OFF" and the power request state stored in the storage unit 12 of the apparatus (server apparatus #1) is in "power ON", both power request states are inconsistent with each other.

Here, the IPMI power supply packet creating unit 29 of the server apparatus #1 creates the IPMI power supply packet (process 322 in FIG. 16) and delivers the created IPMI power supply packet to the fourth transmission unit 24. Such IPMI power supply packet, as described above, is the Chassis Control Command which uses the power supply packet receiving function of the IPMI by the CPU 35.

The fourth transmission unit 24 transmits the IPMI power supply packet received from the IPMI power supply packet creating unit 29 to the second receiving unit 32 of the CM #1 (process 323 in FIG. 16).

The second receiving unit 32 of the CM #1 receives the IPMI power supply packet transmitted from the fourth transmission unit 24 of the server apparatus #1 (process 324 in FIG. 16) and delivers the received IPMI power supply packet to the power management unit 38.

The power management unit 38 analyzes the IPMI power supply packet received from the second receiving unit 32 (process 325 in FIG. 16).

In addition, the power management unit 38 updates the power request state of the server apparatus #1, which is stored in the power supply storage unit 52 and the power disconnection storage unit 53 of the memory 51 (process 326 in FIG. 16). With the process 326, the power request state of the server apparatus #1 is updated to "power ON" and the power request state of the server apparatus #0 is maintained at "power ON". Further, the power request state stored in the memory 51 of the CM #1 and the power request state stored in the storage unit 12 of the server apparatus #1 are consistent with each other and the server apparatus #0 terminates the power supply processing of the server apparatus 2.

Next, the power disconnection packet creating unit 27 of the server apparatus #0 creates the power disconnection packet (process 327 in FIG. 17) and delivers the created power disconnection packet to the second transmission unit 22. The power disconnection packet is the Chassis Control Command which uses the power disconnection packet receiving function of the IPMI by the CPU 35, as described above. Note that, the power management unit 11 recognizes that the apparatus (server apparatus #0) performs the power disconnection request on the storage apparatus 3 at the time of creating the power disconnection packet and allows "power OFF" as a power request state to be stored in the storage unit 12.

The second transmission unit 22 transmits the power disconnection packet received from the power disconnection packet creating unit 27 to the second receiving unit 32 of the CM #0 (process 328 in FIG. 17).

The second receiving unit 32 of the CM #0 receives the power disconnection packet transmitted from the second transmission unit 22 of the server apparatus #0 (process 329 in FIG. 17) and delivers the received power disconnection packet to the power disconnection packet analyzing unit 36.

The power disconnection packet analyzing unit 36 analyzes the power disconnection packet received from the second receiving unit 32 (process 330 in FIG. 17) and notifies that the power disconnection packet has been received to the power management unit 38.

The power management unit 38 receives the notification of the power disconnection request state from the power disconnection packet analyzing unit 36 and updates the power request state of the server apparatus #0, which is stored in the power supply storage unit 52 and the power disconnection storage unit 53 of the memory (process 331 in FIG. 17). With the process 331, the power request state of the server apparatus #0 is updated to "power OFF" and the power request state of the server apparatus #1 is maintained at "power ON".

The confirmation unit 39 determines whether there is the power disconnection request from all of the server apparatuses 2 with reference to the power disconnection request state of the power disconnection storage unit 53 (process 332 in FIG. 17).

In the process 332, since the power disconnection request state of the server apparatus #1 is not in "power OFF", the storage apparatus 3 waits for a following process (see NO route of process 332 in FIG. 17).

Note that, when the power disconnection request states of all server apparatuses 2 are updated to "power OFF" (see YES route of process 332 in FIG. 17), the power disconnection unit 37 instructs the power-supply apparatus 60 to perform the power disconnection (process 333 in FIG. 17).

With the above processes, the power request state stored in the storage unit 12 of each server apparatus 2 is consistent with the power request state stored in the memory 51 of the storage apparatus 3.

[B-4] Effects

In this manner, according to the information processing system 1 of the second embodiment, it is possible not only to obtain the same operational effects as in the above-described first embodiment but to achieve following effects.

That is, even when the server apparatus 2 and the storage apparatus 3 are cluster-connected to each other, the server apparatus 2 can reliably perform the power control of the storage apparatus 3, resulting in improving the reliability of the information processing system 1.

In addition, with the creation of the power confirmation request packet by the power confirmation packet creating unit 28, the server apparatus 2 can refer to the power request state stored in the memory 51 of the storage apparatus 3 in association with each server apparatus 2.

Further, with the creation of the IPMI power supply packet by the IPMI power supply packet creating unit 29, the server apparatus 2 can accurately update the power request state stored in the memory 51 of the storage apparatus 3 in association with each server apparatus 2.

In addition, the confirmation unit 39 confirms whether the storage apparatus 3 receives the power disconnection packet from all of the server apparatuses 2 with reference to the power disconnection storage unit 53. When the storage apparatus 3 receives the power disconnection packet from all of the server apparatuses 2, it is possible to reliably process an access request from the server apparatus 2 to the storage apparatus 3 by performing the power disconnection of the storage apparatus 3 by the CPU 35, thereby preventing the damage from occurring in the information processing system 1.

[C] Others

The disclosed technique is not restricted to the above-described embodiments and various modifications may be made without departing from the spirit of the embodiments. Each configuration and each process of the embodiments can be selected, discarded, or properly combined as needed.

According to the disclosed communication control apparatus, it is possible to improve reliability of the remote power control in an apparatus in which communication is performed using LAN.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control apparatus communicably connected to a plurality of higher-level apparatuses, the communication control apparatus comprising:

a local area network controller configured to:

receive a power supply packet transmitted by the plurality of higher-level apparatuses;

perform a power supply control when the reception of the power supply packet is detected;

receive a power disconnection packet transmitted by the plurality of higher-level apparatuses, and output the power disconnection packet to an external control apparatus;

transmit state information to one of the plurality of higher-level apparatuses when power supply request state confirmation packets are received from the one of plurality of higher-level apparatuses, the state information indicating reception state of packet relevant to power supply received from the one of plurality of the higher-level apparatuses, and receive power supply request packet, which is different from the power supply packet with regard to packet specification, transmitted by the one of plurality of higher-level apparatuses when a power supply request state of the one of plurality of higher-level apparatuses is inconsistent with the state information.

2. The communication control apparatus according to claim 1, wherein the power supply packet is a magic packet.

3. The communication control apparatus according to claim 1, wherein the power disconnection packet is an Intelligent Platform Management Interface (IPMI) packet.

4. An information processing apparatus communicably connected to a plurality of higher-level apparatuses, the information processing apparatus comprising:

a local area network controller;
a processor; and
a memory apparatus,
wherein
the local area network controller is configured to:
   receive a power supply packet transmitted by the plurality of higher-level apparatuses;
   perform a power supply control when the reception of the power supply packet is detected; and
   receive a power disconnection packet transmitted by the plurality of higher-level apparatuses, and output the power disconnection packet,
the processor is configured to control the information processing apparatus;
   analyze the power disconnection packet received from the local area network controller, and
   disconnect a power of the information processing apparatus,
the memory apparatus is configured to store state information indicating reception state of packet relevant to power supply received from each of the higher-level apparatuses, and
the local area network controller transmits the state to one of the plurality of higher-level apparatuses when power supply request state confirmation packets are received from the one of plurality of higher-level apparatuses, and receives power supply request packet, which is different from the power supply packet with regard to packet specification, transmitted by the one of plurality of higher-level apparatuses when a power supply request state of the one of plurality of higher-level apparatuses is inconsistent with the state information.

5. The information processing apparatus according to claim 4, wherein
   the memory apparatus stores a reception state of the power disconnection packet received from each of the higher-level apparatuses;
   the processor confirms whether the power disconnection packets are received from all of the plurality of higher-level apparatuses, and
   when the processor confirms that the power disconnection packets are received from all of the plurality of higher-level apparatuses, the processor disconnects a power of the information processing apparatus.

6. An information processing system in which a plurality of higher-level apparatuses is communicably connected to an information processing apparatus through a network, wherein each of the plurality of higher-level apparatuses include a first local area network controller and a first memory apparatus, wherein
   the first local area network controller is configured to
      output a power supply packet to a power supply target,
      output a power disconnection packet to the power supply target, and
      transmit a power supply request state confirmation packet after outputting the power supply packet to the power supply target,
   the first memory apparatus is configured to store a power supply request state in the higher-level apparatus, and
   the first local area network controller transmits a power supply request packet, which is different from the power supply packet with regard to packet specification, to the information processing apparatus when the power supply request state of the first memory apparatus is inconsistent with state information indicating a reception state of a packet relevant to a power supply on the higher-level apparatus, which is transmitted from the information processing apparatus depending on the power supply request state confirmation packet, and
   the information processing apparatus includes
      a second local area network controller,
      a processor, and
      a second memory apparatus,
   wherein
   the second local area network controller is configured to:
      receive the power supply packet,
      perform a power supply control when the reception of the power supply packet is detected, and
      receive the power disconnection packet and output the power disconnection packet,
   the processor is configured to:
      control the information processing apparatus,
      analyze the power disconnection packet received from the second local area network controller, and
      disconnect a power of the information processing apparatus;
   the second memory apparatus is configured to store the state information indicating the reception state of the packet relevant to the power supply received from each of the higher-level apparatuses, and
   the second local area network controller transmits the state information to one of the plurality of higher-level apparatuses when the power supply request state confirmation packets are received from the one of plurality of higher-level apparatuses, and receives the power supply request packet transmitted by the one of plurality of higher-level apparatus.

7. The information processing system according to claim 6, wherein the second memory apparatus stores a reception state of the power disconnection packet received from each of the higher-level apparatuses the processor confirms whether the power disconnection packets are received from all of the plurality of higher-level apparatuses, and
   when the processor confirms that the power disconnection packets are received from all of the plurality of higher-level apparatuses, the processor disconnects a power of the information processing apparatus.

* * * * *